United States Patent [19]

Klos-Hein et al.

[11] Patent Number: 5,331,484
[45] Date of Patent: Jul. 19, 1994

[54] MAGNETIC TAPE CASSETTE APPARATUS HAVING A CONTROL ROD, SWITCHING TRANSMITTERS, AND A CATCH ROD

[75] Inventors: Karl Klos-Hein, Wettenberg; Hermann Rumpf, Herborn-Schonbach; Hans-Georg Hermanni, Sinn, all of Fed. Rep. of Germany

[73] Assignee: U.S. Philips Corporation, New York, N.Y.

[21] Appl. No.: 989,488

[22] Filed: Dec. 10, 1992

Related U.S. Application Data

[63] Continuation of Ser. No. 425,895, Oct. 23, 1989, abandoned.

[30] Foreign Application Priority Data

Oct. 25, 1988 [DE] Fed. Rep. of Germany ....... 3836247
May 9, 1989 [DE] Fed. Rep. of Germany ....... 3915110

[51] Int. Cl.⁵ .............................................. G11B 5/008
[52] U.S. Cl. ...................................... 360/96.5; 360/71
[58] Field of Search ...................... 360/70, 75, 83, 90, 360/93, 96.1, 96.5, 105, 69, 71

[56] References Cited

U.S. PATENT DOCUMENTS 3,882,542  5/1975  Nakamichi ............................ 360/71
4,573,088  2/1986  Kommoss ............................... 360/71
4,639,797  1/1987  Kobayashi et al. .................... 360/71
4,672,478  6/1987  Takai et al. ...................... 360/96.5 X
4,723,236  2/1988  Kitami ............................. 360/96.5 X
4,743,986  5/1988  Klös-Hein ............................. 360/71
4,866,552  9/1989  Nagase ............................... 360/965
4,885,648 12/1989  Yoshimura ......................... 360/96.5
4,979,061 12/1990  Kishimoto et al. ................. 360/96.5

Primary Examiner—Andrew L. Sniezek
Attorney, Agent, or Firm—Brian J. Wieghaus

[57] ABSTRACT

A magnetic tape cassette apparatus having a control device for controlling drive mechanism functions including the drawing in and ejection of a cassette. A control rod is longitudinally displaceable backwards and forwards by a servo motor between end points on its path of movement and, in certain operating positions, controls drive mechanism functions in conjunction with switching transmitters and a logic circuit. A catch rod is movably guided on the control rod in the longitudinal direction of the latter. The catch rod is lockable to the control rod and is mechanically coupled to the loading mechanism of the drive mechanism. The catch rod and the control rod act on a control switch to feed commands imparted by switch actuators on the rods to the logic circuit, which forms switching commands therefrom for apparatus functions.

16 Claims, 22 Drawing Sheets

MAGNETIC TAPE CASSETTE APPARATUS HAVING A CONTROL ROD, SWITCHING TRANSMITTERS, AND A CATCH ROD

This is a continuation of application Ser. No. 07/425,895, filed Oct. 23, 1989, now abandoned.

BACKGROUND OF THE INVENTION

The invention relates to a magnetic tape cassette apparatus having a control device for controlling drive mechanism functions including the drawing in and ejection of a cassette by means of a drive which is equipped with a motor and comprises a control rod which is longitudinally displaceable backwards and forwards by a servo motor, is drivable between end points on its path of movement and, in certain operating positions, controls drive mechanism functions in conjunction with switching transmitters and a logic circuit.

U.S. Pat. No. 3,882,542 discloses a drive mechanism for a magnetic tape cassette apparatus, which has a rod which can draw in a magnetic tape cassette. During drawing in, this rod travels as far as an end point situated at the end of the path of inward movement and stops there. A switch nudged by the rod switches on the motor for the playing mode and a mechanism assumes the playing of the magnetic tape. The end point is determined by a pin which switches the motor switch and simultaneously switches over a servo gear unit, which is prepared to push the cassette out again in the reverse direction of rotation when the tape has come to a halt at the end of the tape.

It is the object of the invention to create a magnetic tape cassette apparatus having a control device of the type mentioned at the outset, in which the movements of the control rod at and between the end points of movement can call into action drive mechanism functions with little technical expenditure.

SUMMARY OF THE INVENTION

The object set is achieved according to the invention in a first embodiment by the fact that
 a catch rod is movably guided on the control rod, in the longitudinal direction of the latter,
 the catch rod is lockable to the control rod, the catch rod is mechanically coupled to the loading mechanism of the drive mechanism,
 by switching transmitters provided on them for triggering switching signals, the catch rod and the control rod act on a control switch which feeds the commands, imparted by switching transmitters, to the logic circuit, which forms switching commands therefrom for apparatus functions.

In a second embodiment, the object set is achieved according to the invention by the fact that
 a catch rod which can be moved transversely to the longitudinal direction of movement of the control rod is arranged on the control rod,
 the catch rod can be coupled to the loading mechanism of the drive mechanism,
 the catch rod can be coupled to or uncoupled from the loading mechanism by transverse movements with the aid of guides arranged fixed on the drive mechanism,
 at least the control rod acts by at least one switching transmitter provided on it for triggering switching signals on a control switch which feeds the commands, imparted by the switching transmitter, to the logic circuit, which forms switching commands therefrom for apparatus functions.

Via the coupling to the loading mechanism, the control rod is also equipped to draw in and eject cassettes. If the cassette tray engages on the control rod only indirectly, i.e. via the catch rod, then, by reason of a movement independent of the control rod, the catch rod can release the mechanical connection between control rod and cassette tray, thus enabling the control rod to stop before the end of the drawing in of a cassette or at the beginning of the eject movement. The end of drawing in and the beginning of ejection can be assumed by spring-loaded levers. In addition, control rod and catch rod, or the control rod alone, can directly or indirectly trigger switching signals at the switch.

According to a further development of the invention, it is envisaged that, in both embodiments, all switching transmitters of the control device act on a single control switch which controls all electrical control functions of the drive mechanism via the logic circuit.

The action of all switching transmitters on a single control switch leads to a considerable simplification of the drive mechanism in conjunction with the logic circuit. The derivation of electrical signal pulses from mechanical movements in conjunction with a logic circuit leads to a considerable simplification of the control device.

According to a further development of the invention, it is envisaged that, in both embodiments, at least at the end points of their path of movement, the control rod and the catch rod are uncoupled from one another so that their switching transmitters can act on the control switch and, if required, other functional parts independently of the position of the other rod in each case. Decoupled from the loading mechanism, the control rod can thus travel on as far as the end point of its path of movement and there, in addition to a switching transmitter which causes the reversal of the direction of rotation of the servo motor, can bring the head plate into its playing position.

According to a further development of the invention, it is envisaged that, in the case of the first embodiment, a two-armed detent rocker is arranged on the control rod, the first detent arm of said detent rocker having a tendency under spring loading when passing through a sub-section of the rod movement path to at least travel into a recess of the catch rod for the purpose of coupling control rod and catch rod, and the second detent arm of said detent rocker interacting with fixed guides which, by their action, swivel the detent rocker counter to spring force in such a way that the first detent arm cannot travel into the recess and thus cannot couple. By means of the dogs, the coupling of control rod and catch rod can thus be deliberately cancelled at desired positions of the rods.

According to a further development of the invention, it is envisaged that, in both embodiments, the control switch has a switching projection which, when not mechanically loaded, is situated in a neutral central position and which when released or nudged in one or other displacement direction of the rods by the switching transmitters emits switching pulses. The control switch can thus be induced to emit signal pulses as a result of two opposite sequences of motions.

According to a further development of the invention, it is envisaged that, in both embodiments, the control rod has a rack toothing and a gear of the servo gear unit interacts with the rack toothing. The design as a rack represents a simple and operationally reliable method of transmitting motion.

According to a further development of the invention, it is envisaged that, in both embodiments, during its longitudinal movement in the draw-in direction of a cassette, the control rod, after decoupling from the loading mechanism up to the end point of its path of movement, can be driven independently of the loading mechanism, specifically so far that it strikes against a leg of the head plate of the apparatus and thus swivels the head plate into its playing position, a switching transmitter on the control rod nudging the control switch in order to effect a reversal in the direction of rotation of the servo motor. This overstroke of the control rod is made possible by the decoupling.

According to a further development of the invention, it is envisaged that, in the case of the first embodiment, the catch rod is provided with a switching transmitter which, during the insertion of the cassette, causes the control switch to emit a starting pulse and, during ejection, causes it to emit a switch-off pulse for the servo motor. The beginning and end of the operating functions can thus be easily switched via the catch rod.

According to a further development of the invention, in the case of the second embodiment having an actuating lever which is pivotably mounted to the side of the loading mechanism and, engaging with the loading mechanism, acts on a cassette catch which can be moved between an eject and a draw-in position, that it is envisaged that the actuating lever acts with an operating pin, acting as switching transmitter, on the sole control switch for the emission of start and stop pulses. By means of the manually inserted cassette, the drive mechanism is thus switched on via the actuating lever by means of the one control switch during insertion.

According to a further development of the invention, it is envisaged, in the case of both embodiments, that a servo gear unit switching member swivellable about a pivot is provided which likewise has a switching transmitter for the one control switch which, after completion of the servo movements of the servo mechanism, imparts the signal to the logic circuit, by nudging the control switch, that servo operations, such as the drawing in of the cassette or the bringing of the head plate into playing position, have been completed. If the control member emits the signal that the servo movement has been completed, then the control member has already switched off the servo gear unit. According to a further development of the invention, the switching off has namely been accomplished by the fact that the swivellable switching member can be held in the servo driving position by the control rod itself, by means of a servo gear, which is supported by said switching member and can establish the connection between the servo motor and the toothing of the control rod, and, for the purpose of switching over from servo mode to playing mode, is releasable by the control rod from this connection, for swivelling and effecting the switchover with simultaneous actuation of the control switch.

According to a further development of the invention, it is envisaged that the switching member has a stop pin which, in conjunction with the leg of the head plate, holds the servo mechanism in the position of engagement with the control rod or releases it for the switchover. The switching member can thereby be held in a stand-by position. Since, according to a further development of both embodiments of the invention, it is envisaged that as it swivels out, the switching member releases a driver pin of a reversing mechanism from a fork-shaped holder so that the reversing mechanism can place a transmission gear against the one or the other winding disk for the purpose of coupling the central gear to one of the winding disks, in this stand-by position the transmission gear can be held apart from the winding disks.

According to a further development of the invention it is envisaged that the switching member is provided with a guiding pin which, during the movement of the control rod, engages behind a guiding edge of the control rod, and the servo gear unit drives the control rod and the reversing gear unit is out of engagement with the winding disks. As a result, the control rod holds the switching member in the position in which the switching member couples the servo gear unit to the rack of the control rod during the movement of the control rod.

According to a further development of the second embodiment of the invention, it is envisaged that the catch rod is swivellably mounted on the control rod and a catch pocket into which a coupling member of the loading mechanism can engage is formed to the side of the end face of the control rod. The coupling and decoupling of the loading mechanism with the control rod is thus achieved by the swivelling of the catch rod.

According to a further development of the invention, it is envisaged that for the formation of the catch pocket, the catch rod has a coupling projection which, in the coupling position, is situated at a distance from an end face of the control rod, the pocket being formed between the catch projection, the end face and the rod. The catch pocket is thus in each case formed when the coupling member is to be coupled to the control rod.

According to a further development of the invention, it is envisaged that the catch rod is extended beyond the catch pocket and the extension interacts with the guides arranged on the drive mechanism in such a way that these guides swivel the catch rod for the purpose of catching the coupling member in the pocket or releasing it from said pocket, the catch rod being resiliently flexible in the longitudinal direction.

BRIEF DESCRIPTION OF THE DRAWING

The invention is explained in greater detail with reference to the drawing, in which.

DESCRIPTION OF THE PREFERRED EMBODIMENTS

Figure 1:
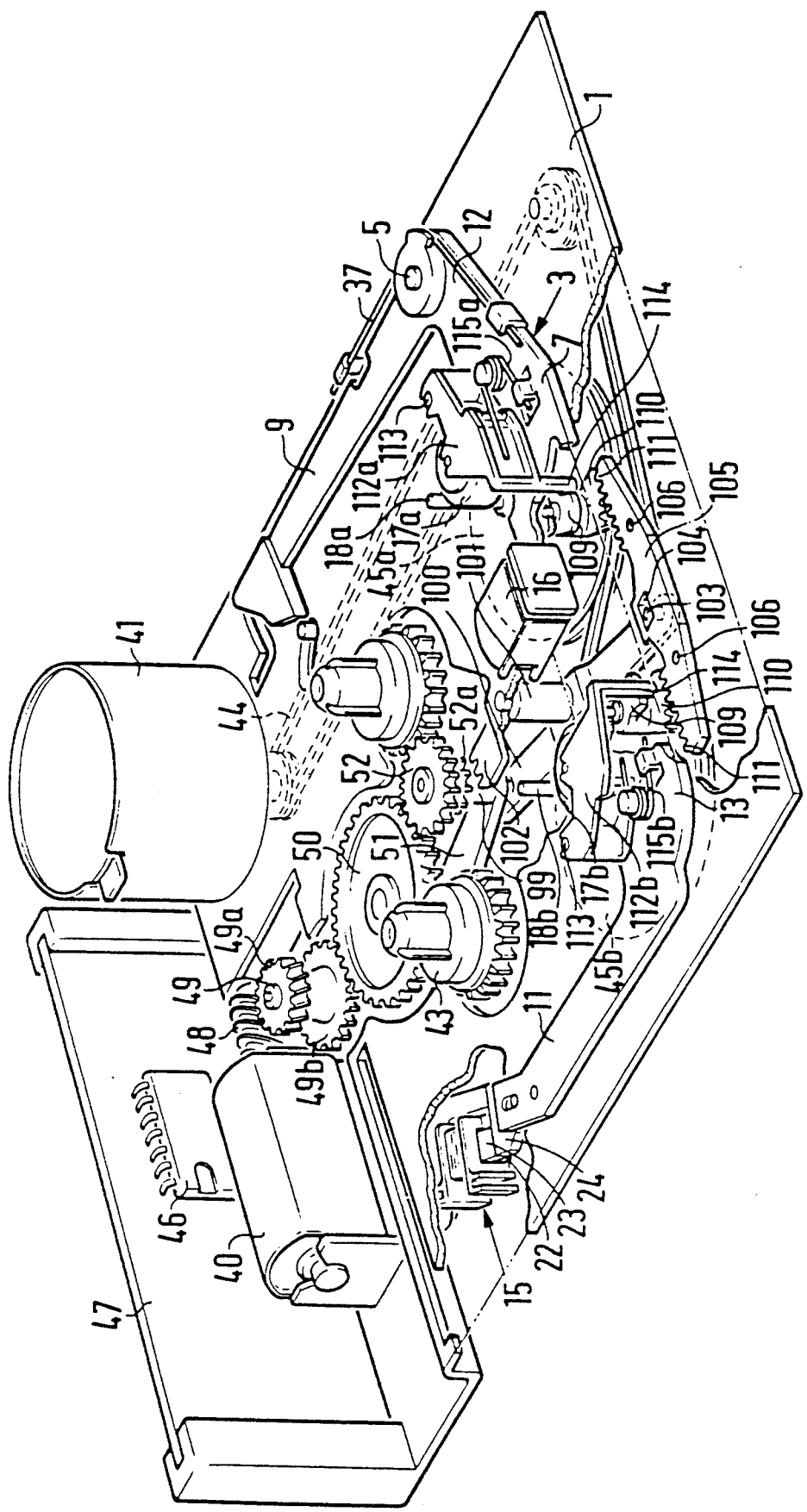
FIG. 1 shows a diagrammatic view of the drive mechanism of a magnetic tape apparatus.
Figure 2:
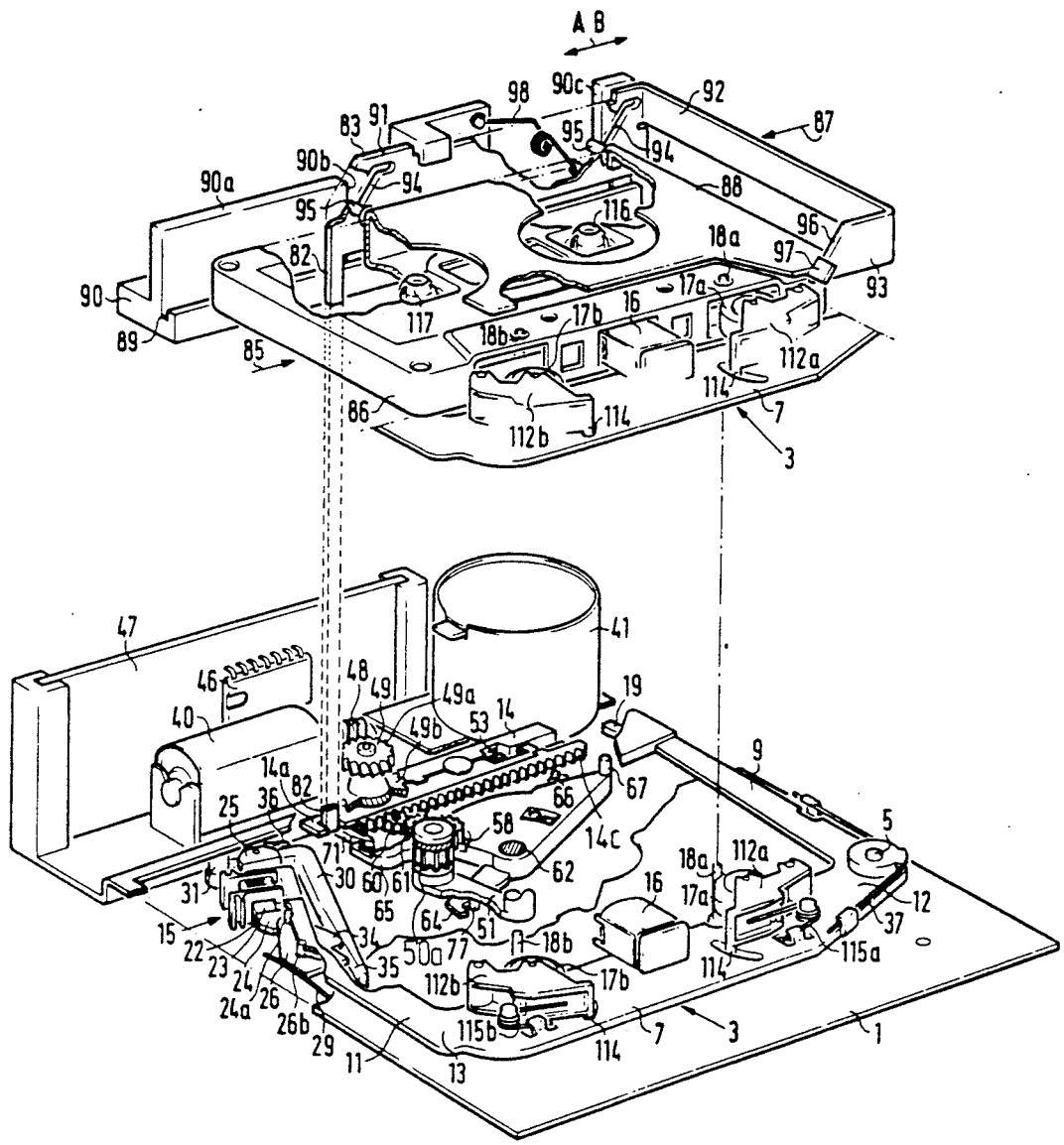
FIG. 2 shows, diagrammatically by means of an exploded view, the lift mechanism and the control mechanism of a head plate and of the lift mechanism.

FIGS. 1 and 2 show a chassis plate 1, acting as a frame, of a magnetic tape cassette apparatus having a head plate 3 which can be swivelled about an excentric 5. The head plate 3 is of U-shaped design and has first and second legs 9 and 11 projecting in the same direction from the ends of its base 7. The legs 9 and 11 engage in corner regions 12 and 13. While the first leg 9 interacts by a transport projection 19 with a control rod 14 (not visible in FIG. 1), the second leg 11 forms a functional part which cooperates with a holding-electromagnet device 15.

The base 7 of the head plate 3 carries a magnetic head 16 and pressure rollers 17a, 17b which can be swivelled relative to the base 7. The pressure rollers 17a and 17b can be brought up against capstans 18a and 18b in order to guide the magnetic tape past the magnetic head 16 in one direction or the other.

The swivelling of the head plate 3 is accomplished in each case via the control rod 14, not visible until FIG. 2. By way of the control rod 14, the head plate 3 can swivel about the excentric pivot 5 and, in the process, pivot in the clockwise direction upon each nudge by means of the control rod 14.

The holding-electromagnet device 15 comprises a magnet coil 20, in whose coil cavity 21 (FIG. 5) legs of U-shaped armature cores 22, 23 magnetically separated from one another are inserted. The two armature cores 22, 23 lie one above the other, the respective armature core legs 22a, 23a overlapping in pairs. The core yokes 22b, 23b are situated at opposite coil ends 20a, 20b. The holding-electromagnet device 15 is firmly mounted on the chassis plate 1.

Pole shoes 23c and 22c which cooperate with a first retaining plate 24 and a second retaining plate 25 are formed at the free leg ends. The first retaining plate 24 is arranged pivotably on a slide 26. This slide 26 engages by the pin 24a in a guide groove 27 of the leg 11. A guiding pin 26b of the slide 26 can be guided along a curved groove 28 of functional part 11. The arcuate groove 28 extends arcuately at an oblique angle towards the holding-electromagnet device 15. A spring 29 ensures that, in the normal case, the guiding pin 26b travels into the end region 28a of the arcuate groove 28. In this position, the slide 26 extends above the leg 11 and parallel to the latter.

The second retaining plate 25 is arranged pivotably on an arm 30 by means of a pin 25a. The arm 30 itself is of L-shaped configuration and has a shorter arm part 30a which also carries the second retaining plate 25 and, at its end 30b, is pivotable about a pivot 31 in the direction of a double arrow 32. A longer arm part 30c extends parallel to the magnet coil 20 as far as a side face 33 of the slide 26, where, in the vicinity of a projection 34 of the slide, it ends with an oblique run-up face 35.

When the retaining plates 24 and 25 have been placed against the pole shoes 23c and 22c respectively, they can adhere to the pole shoes upon excitation of the magnet coil 20. By virtue of this adherence, they can determine two working positions of the head plate 3 for as long as the magnet coil 20 is excited. Only when the magnet coil 20 is de-excited, do both retaining plates—or only one, depending on whether both or only one were placed in contact—fall away and a spring 37 which acts on the base 7 of the head plate 3 can swivel the head plate 3 in the anticlockwise direction into a rest position. Details of the holding-magnet device are described in German Patent Application P 37 14 704.8.

Figure 6:
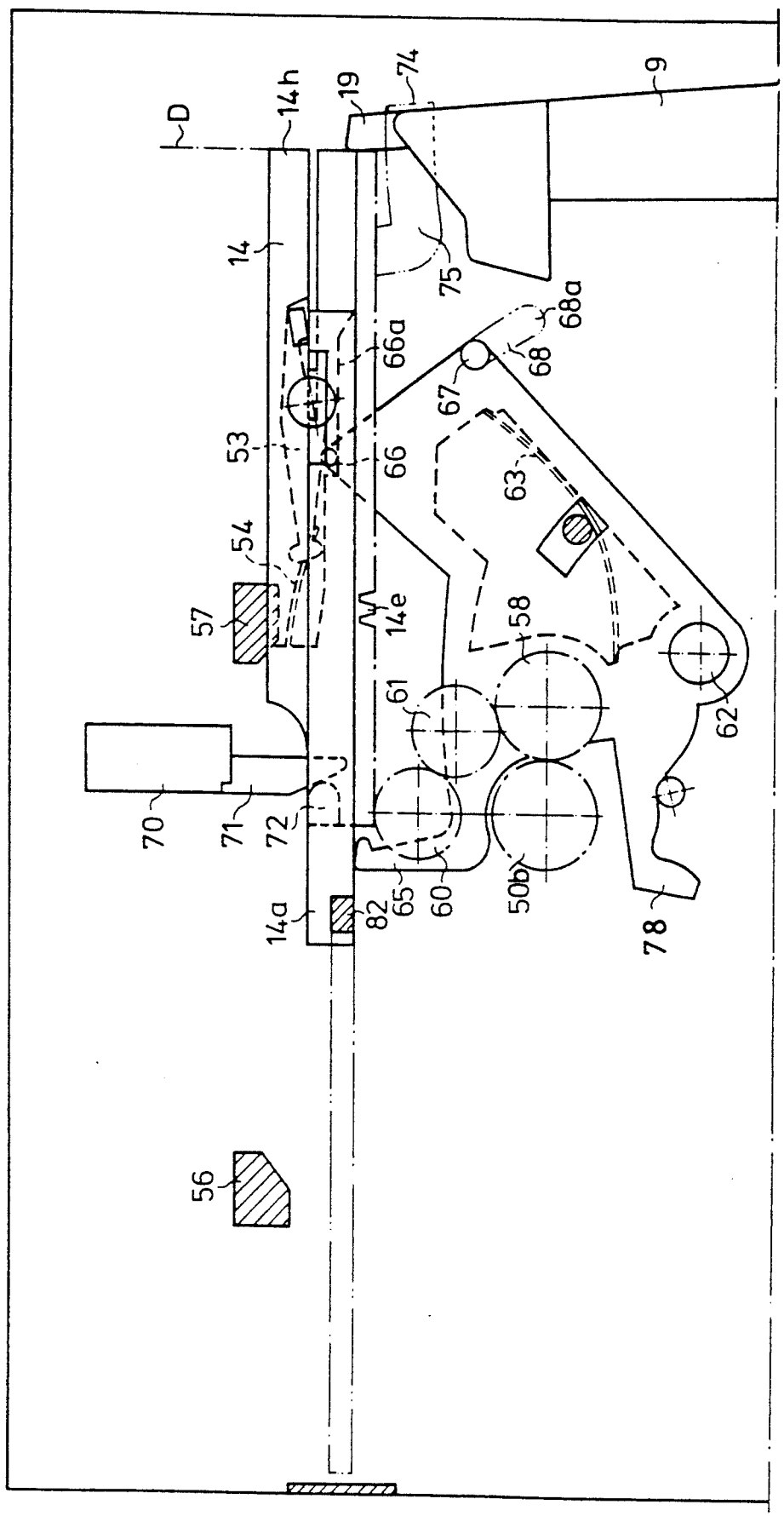
FIG. 6 shows the servo mechanism in a position in which the control rod, upon reaching the end point of the draw-in movement path, has brought the head plate into the playing position.
Figure 7:
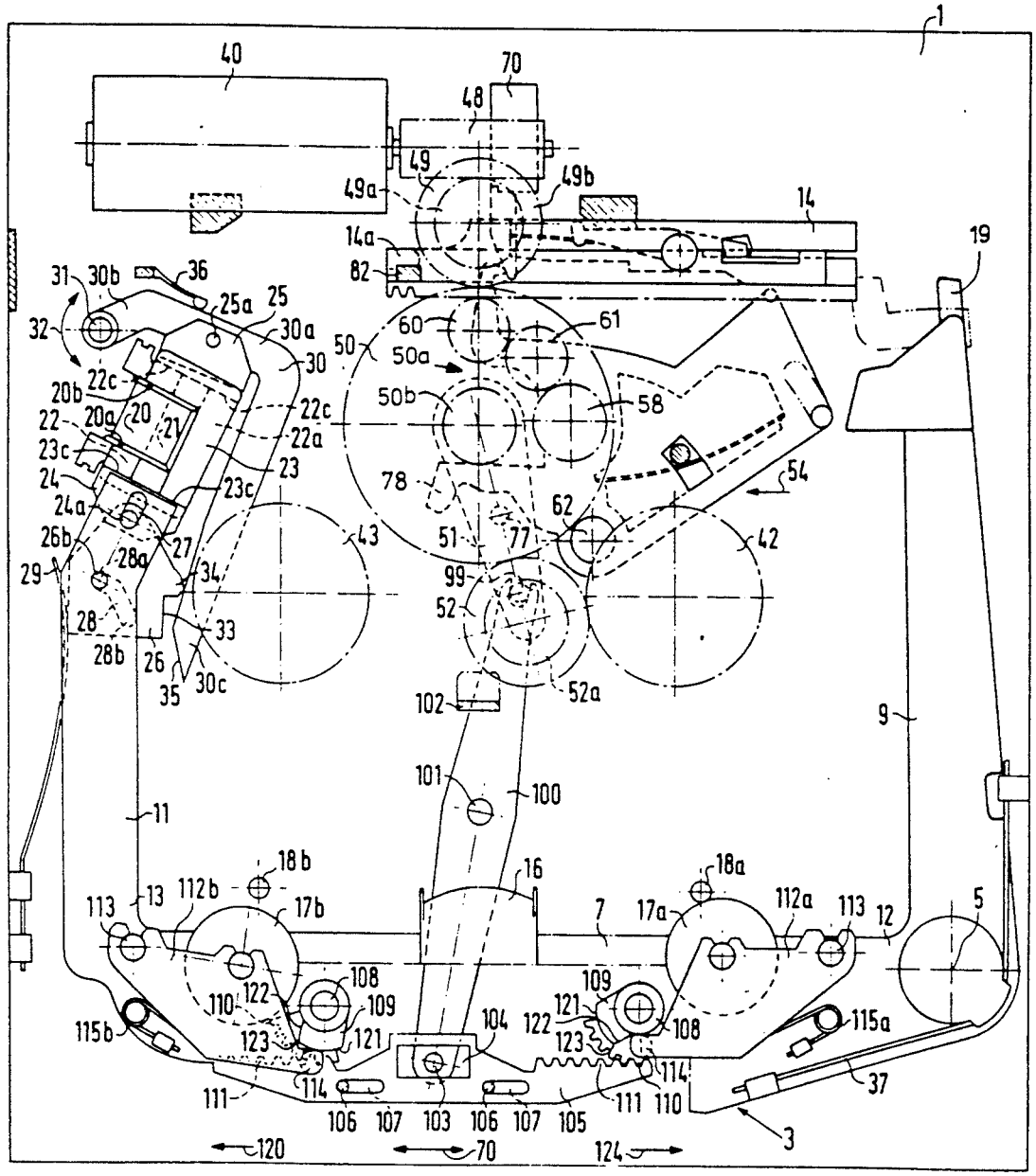
FIG. 7 shows the mechanism according to FIG. 5 in its playing position.
Figure 7A:
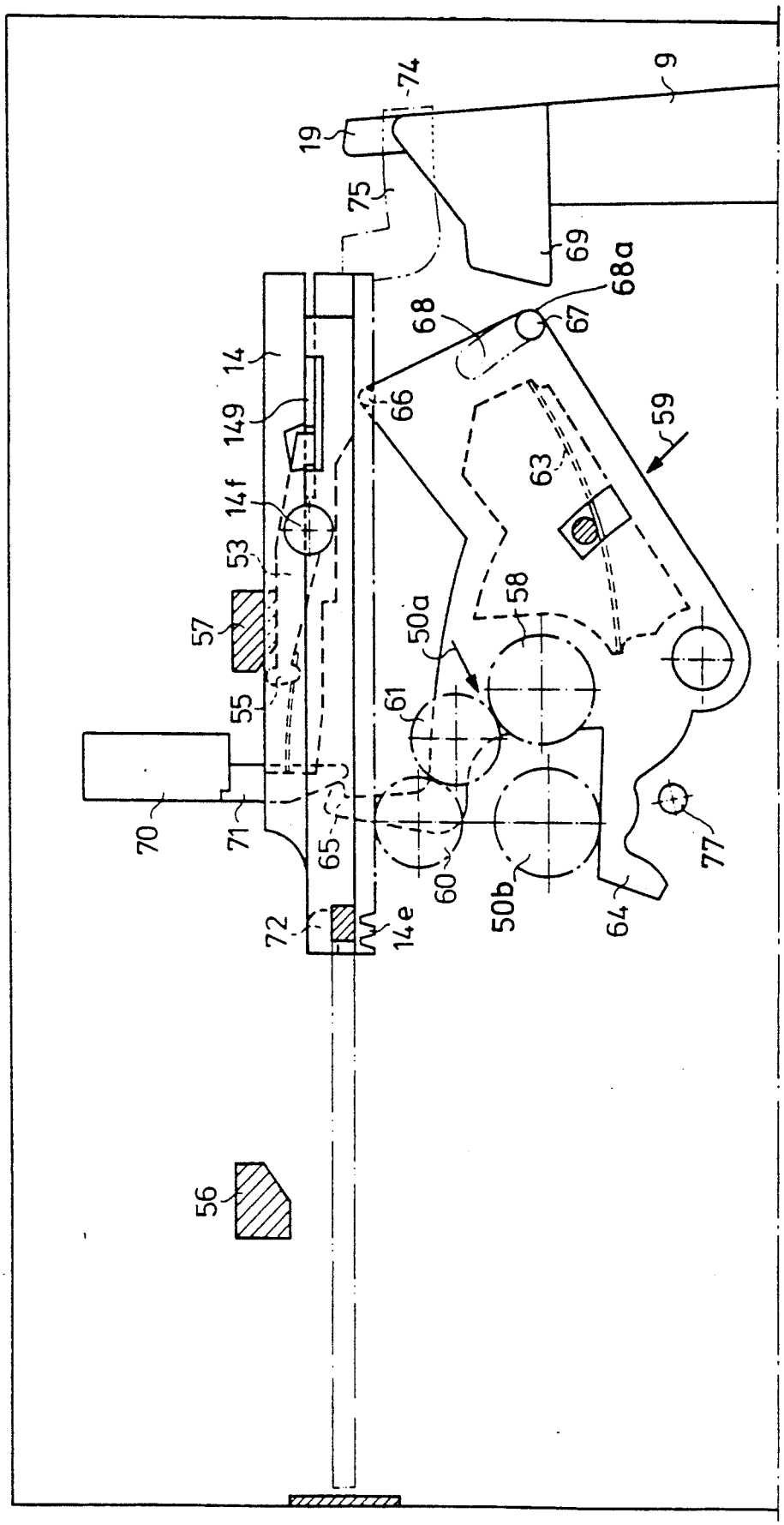
FIG. 7a shows a detail from FIG. 7, with the servo mechanism in the playing position.
Figure 8:
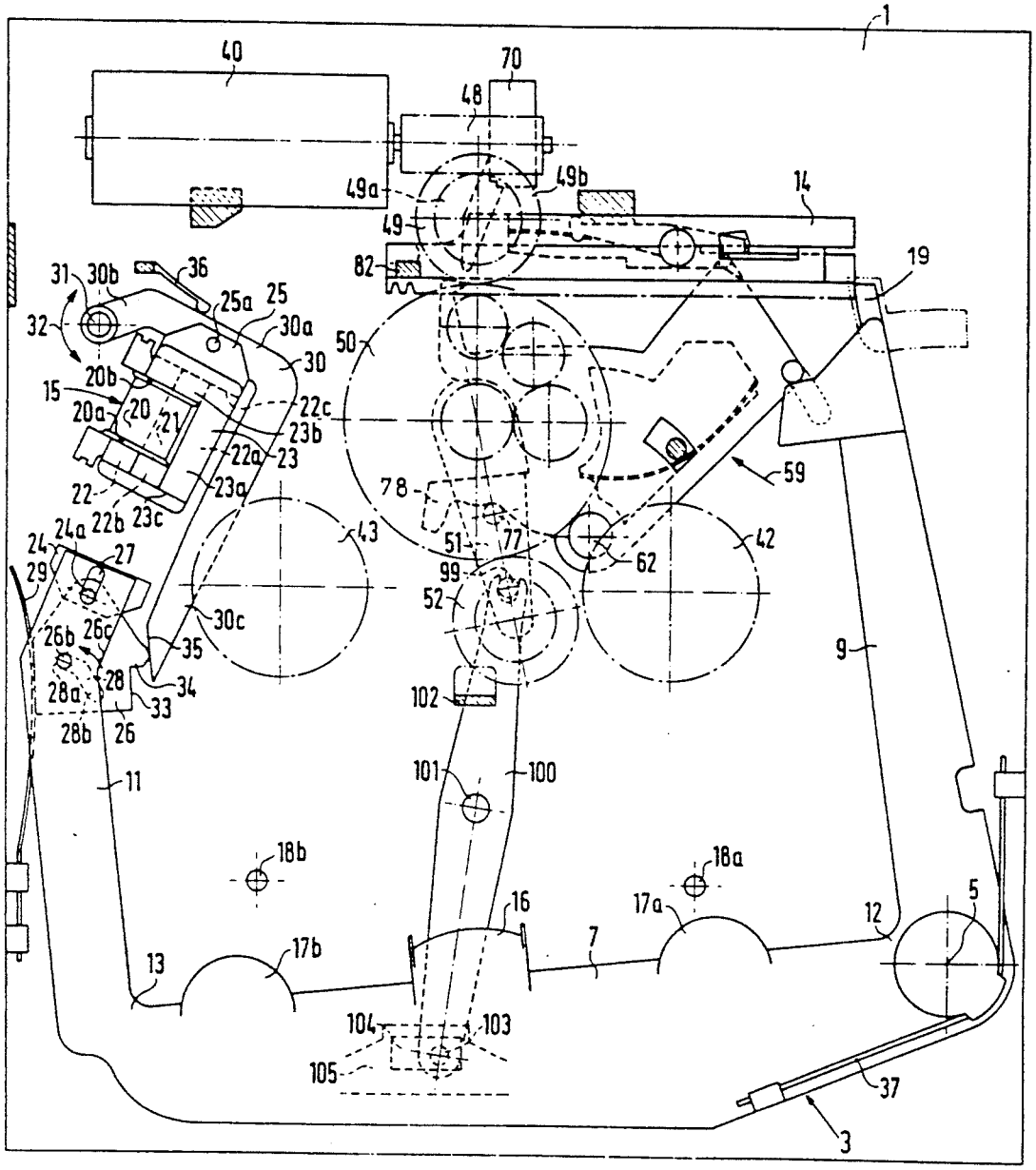
FIG. 8 shows the mechanism according to FIG. 5 in the stand-by position and FIG. 8a shows a detail from FIG. 8.
Figure 8A:
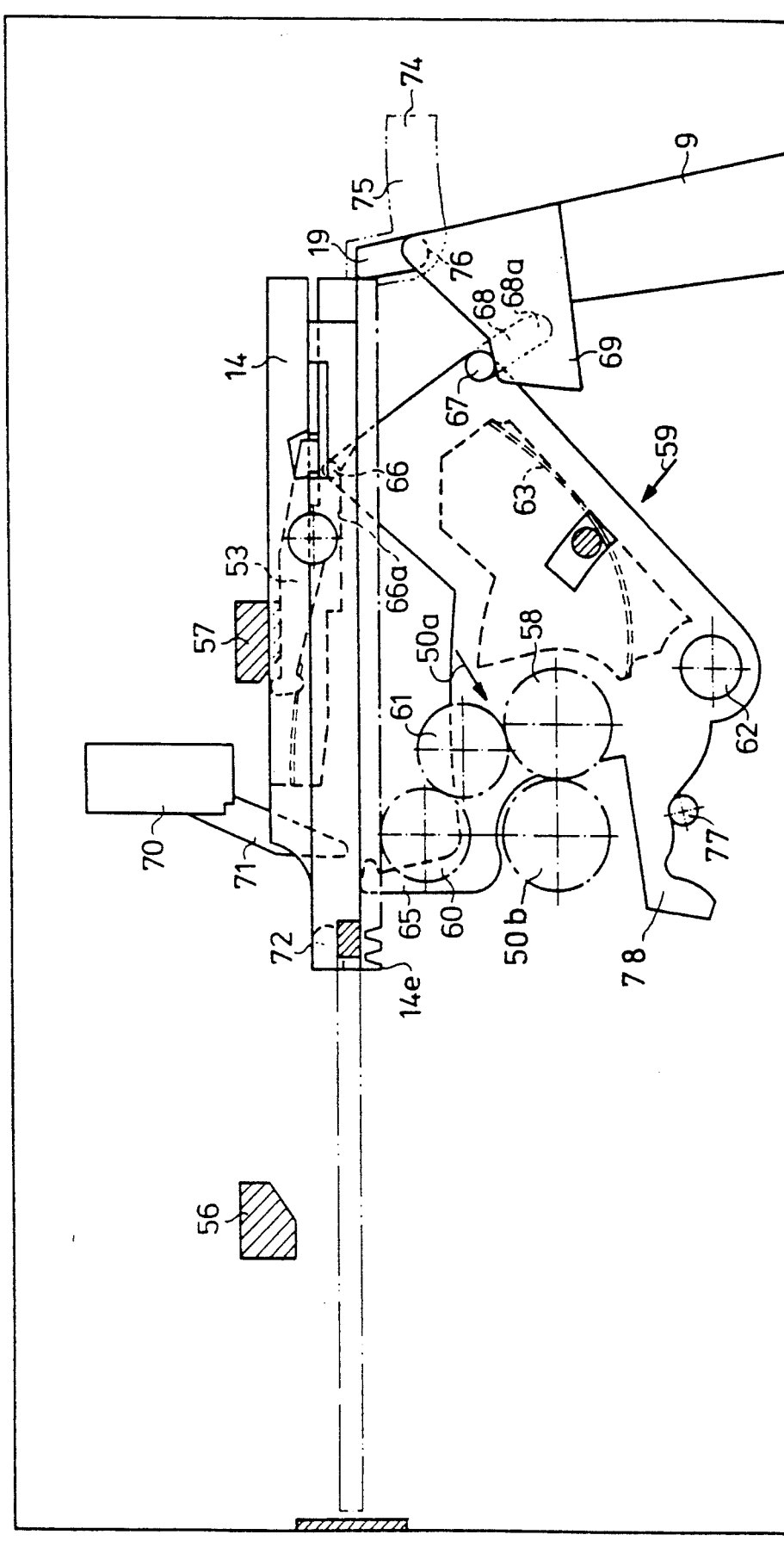

The interaction of the head plate with the holding-electromagnet will now be described with reference to their functioning. FIGS. 8 and 8a show the so-called stand-by or rest position. The magnet coil 20 is de-excited and retaining plate 24 has moved away from the pole shoes 23c of the armature core 23. Retaining plate 25 rests against the pole shoes 22c since a spring 36 ensures continuous contact. Spring 37 holds the head plate 3 swivelled in the anticlockwise direction in the rest or stand-by position. Both the magnetic head 16 and the pressure rollers 17a and 17b fully release a magnetic tape (not shown) which runs between the pressure rollers/capstan pairs 17a, 18a/17b, 18b past the magnetic head 16. If the head plate is to be swivelled into the playing position (FIGS. 6, 7 and 7a) and remain in the playing position, then the control rod 14 strikes against a transport projection 19, the head plate 3 thereby being swivelled in the clockwise direction. The magnet coil 20 initially remains unexcited. In conjunction with the swivelling of the head plate 3 in the clockwise direction, leg 11 also travels towards the holding-electromagnet device 15. The projection 34 of the slide 26 strikes against the oblique face 35 of the longer arm part 30c. The spring 36 is made sufficiently weak for the projection 34 to force the face 35 and thus the longer arm part 30c outwards in the anticlockwise direction. The guiding pin 26b remains in the end region 28a. Functional part 11 guides the first retaining plate 24 against the pole shoes 23c. The magnet coil 20 is now excited, and the retaining plate 24 is held fast against the pole shoes 23c (FIGS. 6 and 7). The head plate 3 is thereby also simultaneously held in the playing position. If the playing operation is at an end, the magnet coil 20 is de-excited and spring 37 swivels the head plate in the anticlockwise direction into the rest or stand-by position. The playing position can be approached again from this rest or stand-by position. The reaching and holding of the fast-winding position will now be explained.

In order to come in to the fast-winding position (FIGS. 9 and 9a), the control rod 14 pushes the head plate into the playing position and the magnet coil 20 is excited. The second retaining plate 25 is already resting against the pole shoes 22c, and to the force of the spring 36 is now added the magnetic retention force. It has thus become more difficult to swivel the longer arm part 30c away in the anticlockwise direction. The projection 34 of the slide 26 is now no longer capable of swivelling the longer arm part 30c away. This means that the projection 34 must give way to the face 35 of the longer arm part 30c. This leads to the guiding pin 26b being pushed to the other end 28b of the arcuate groove 28. By virtue of this displacement, the slide 26 shifts with the guide pin 24a in the groove 27 towards the holding-electromagnet device 15, simultaneously rotating in the direction of an arrow 26c. This means that the leg 11 is virtually extended towards the holding-electromagnet device 15. As a consequence of this extension, the leg 11 cannot advance so far towards the holding-electromagnet device 15 as described above with regard to the playing position. The head plate 3 thus remains a little further back than the playing position according to FIGS. 6 and 7 and the magnetic tape is raised somewhat from the magnetic head 16. In addition, neither of the pressure rollers 17a and 17b respectively rests against either of the capstans 18a, 18b. The position for fast forward and fast rewind is thus achieved.

If fast forward or rewind is to be ended, the magnet coil 20 is de-excited. This leads to the retaining plate 24 coming away from the pole shoes 23c and spring 37 can pivot the head plate 3 in the anticlockwise direction back into the rest or stand-by position (FIG. 8).

Two motors 40, 41 are arranged on the chassis plate 1. Motor 40 serves to control the movements of the head plate 3, the movement of the servo mechanism and the driving of the winding disks 42, 43. Motor 41 serves, via an endless belt 44 (FIG. 1), to drive the capstans 18a, 18b. This drive is accomplished by flywheels 45a, 45b (FIG. 1). The endless belt 44 is here laid in an S-shape around the flywheels 45a, 45b in order to effect opposite directions of rotation of the capstans 18a, 18b. The motors are controlled via a logic circuit 46 which is arranged on a circuit board 47. The circuit board 47 is arranged on the chassis plate 1.

Via a worm shaft 48 and a reduction gear 49 comprising two index gears 49a and 49b, motor 40 drives a central gear 50. A swivel arm 51 on which a transmission gear 52 is rotatably mounted is swivellable about the axle 50a of the central gear 50. By way of a friction clutch (not shown) between the swivel arm 51 and the central gear 50, the transmission gear 52 can be swivelled in such a way that the transmission gear 52 can drive either one winding disk 42 or the other winding disk 43.

Figure 3:
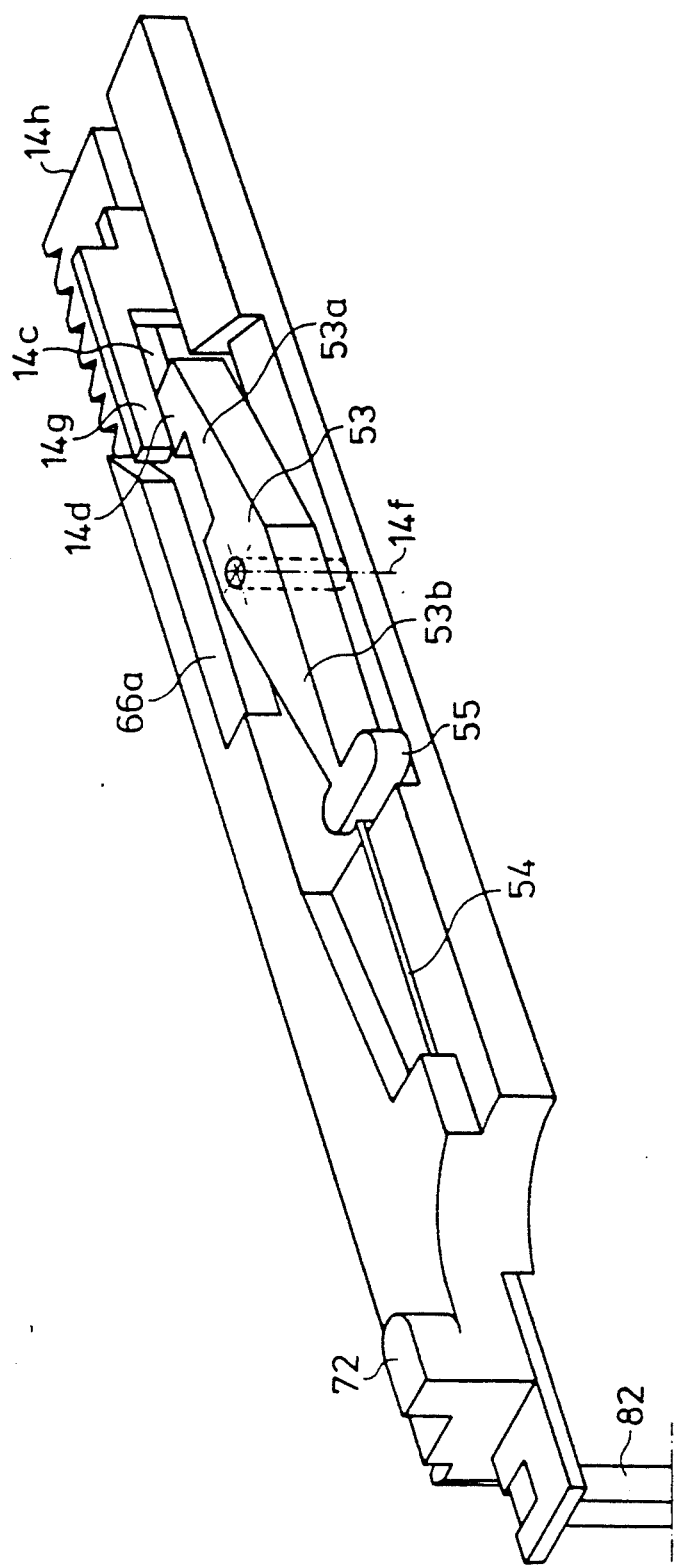
FIGS. 3 and 4 show, in diagrammatic representation, a control rod with catch rod mounted on it, in views from above and below.
Figure 4:
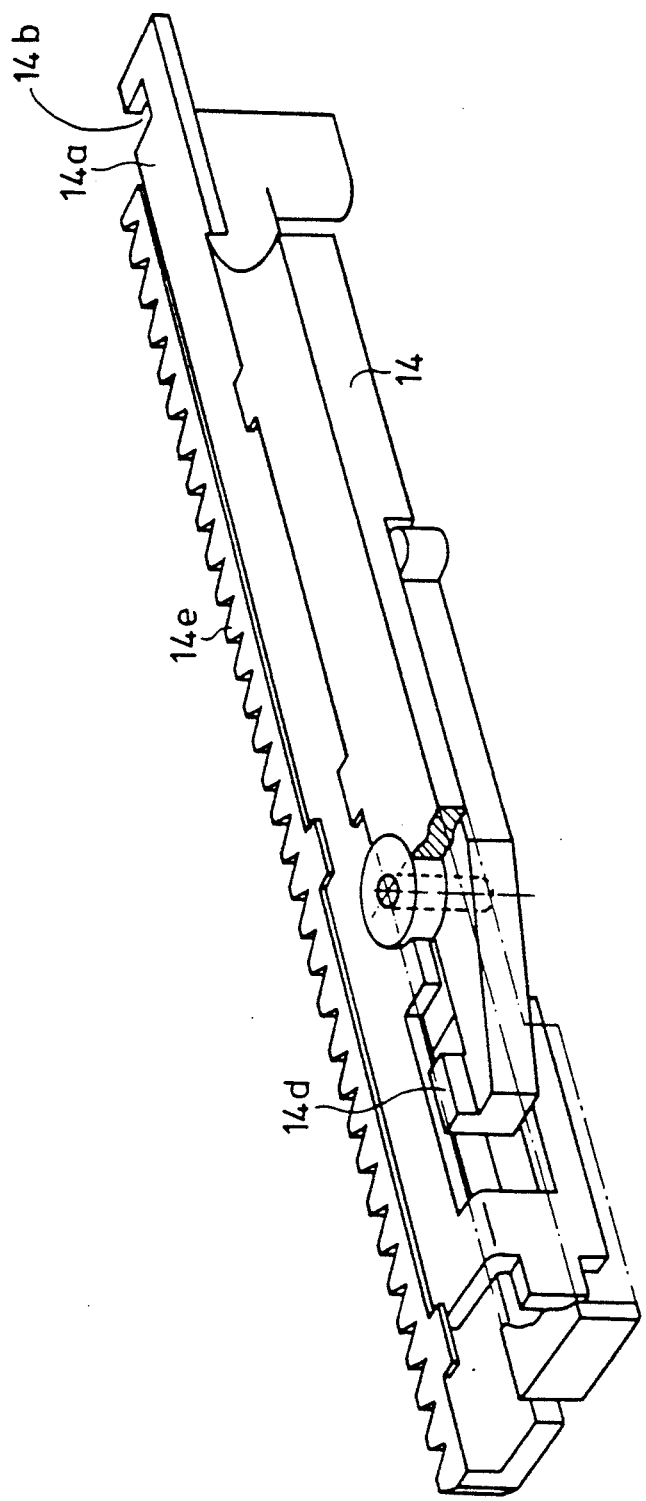

The control rod 14 (FIGS. 3 and 4) carries a catch rod 14a—longitudinally displaceable on it. The catch rod 14a has a hook recess 14b, into which a coupling member 82 of a lift slide to be described later engages. A further coupling recess 14c is used for the engagement of a coupling dog 14d (FIG. 4). The control rod 14 is provided with a rack toothing 14e. FIG. 3 shows, by means of a plan view of the control rod, a two-armed detent rocker 53 swivellable about an axis 14f and having a first detent arm 53a, the coupling dog 14d of which, has a tendency, by reason of the spring loading of a spring 54 acting on a second detent arm 53b, to fall into the coupling recess 14c of the catch rod 14a. At its free end, the second detent arm 53b is provided with a run-on protrusion 55 which interacts With guides 56 and 57 (FIG. 5a) fixed on the chassis.

The control rod 14 is longitudinally displaceably drivable by the servo motor 40 with the aid of a servo gear unit 50a, to which belongs a control gear 58. The control gear 58 is arranged on a switching member 59 and can transmit its rotary movements from a gear 50b rotatable on the axle of the central gear 50 together with the latter, via gears 58, 60 and 61 to the toothing 14e of the control rod. The switching member 59 is mounted so as to be pivotable about a pivot 62 and is loaded in the clockwise direction with the aid of a spring 63. The switching member 59 furthermore has, splaying out in the manner of fingers, a blocking fork 78, a switching transmitter 65, a guiding pin 66, which can run along a guiding edge 66a (FIG. 3) of the control rod 14 until it leaves the latter, and a stop pin 67 (FIG. 5a) which runs in a groove 68 of the chassis plate 1 and interacts with the head 69 of the leg 9.

A control switch 70 (FIG. 5a), the switch projection 71 of which, when unloaded, assumes a neutral central position, is arranged on the chassis plate 1. The switch projection 71 can be nudged from both directions of movement, indicated by arrows A and B in FIG. 5a, by switching transmitters, the switch emitting signal pulses to the logic circuit 46. The switching transmitters are a catch hook 14g on the catch rod 14a, a switching-member hook 65 and a control rod dog 72.

The coupling member 82 establishes the connection to a lift slide 83 (FIG. 2). The direction of an arrow 85 (arrow B in FIG. 5a) indicates the direction of insertion of a cassette 86 into a loading mechanism 87 to which the lift slide 83 belongs. The loading mechanism 87 has a lift tray 88, which accommodates the cassette 86.

The lift slide 83 is guided in a slideway 89 (FIG. 2) so as to be longitudinally displaceable in the direction of a double arrow AB. In this arrangement, the slideway 89 belongs to a plastic component 90 which is connected in a manner not illustrated to the chassis plate 1. In the representation according to FIG. 2, the lift slide 83 is of somewhat U-shaped design with a long leg 91, a base 92 and a short leg 93. In the long leg 91 there are provided two oblique guideways 94 in which pins 95 of the lift tray 88 are guided. The short leg 93 is likewise provided with an oblique guideway 96, which interacts with a tab 97 of the lift tray. In this way, the lift tray 88 receives a type of three-point bearing or guidance relative to the lift slide 83. An overcentre helper spring 98 is furthermore provided which is supported on the one hand on the plastic component 90 and on the other hand on the long leg 91 of the lift slide 83.

The plastic component 90 has a horizontal edge 90a which is bounded by a vertical edge face 90b. Parallel to the vertical edge face 90b there extends a further vertical edge face 90c. The distance between the two vertical edges 90b and 90c corresponds to the distance between the pins 95, the pins 95 being able to move between the vertical edge faces 90b and 90c, along the latter.

FIG. 1 furthermore shows that the swivel arm 51 which supports the transmission gear 52 and is swivellable about the axle of the central gear 50 is arranged between the winding disks. On the swivel arm 51 there is mounted a blocking pin 77 which engages in the blocking fork of the switching member 59. By catching the blocking pin 77 (FIG. 7), the blocking fork 78 is in a position to urge the transmission gear 52 away from the winding disks 42, 43 and thus release the drive coupling between in each case one of the winding disks 42, 43 and the servo motor 40 or the central gear 50. The swivel arm 51 furthermore has a joint 99 on which an adjusting lever 100 engages which can swivel about a pivoting bearing 101. In one zone of the swivelling movement of the transmission gear 52 there is arranged a fixed tooth segment 102 on which the transmission gear 52 can roll. For this purpose, the transmission gear carries on its underside an index gear 52a. On that side of the adjusting lever 100 which is remote from the Joint 99, the adjusting lever 100 bears a pin 103 which is displaceable to a limited extent in a longitudinal slot 104. The longitudinal slot 104 is situated in a slide 105 having pins 106 which are displaceable in longitudinal slots 107 of the chassis plate, specifically parallel to the double arrow 70 (FIG. 7).

Cams 109 which are connected to toothed segments 110 are swivellable about pivots 108 on the chassis plate 1. These toothed segments 110 cooperate with racks 111 of the slide 105. Thus, by a swivelling of the adjusting lever 100 about the pivoting bearing 101, the pin 103, upon reaching one or the other end edge of the longitudinal slot 104, can displace the slide 105 in one or the other direction of the double arrow 70. During this displacement, a rotation of the cams 109 takes place. The pressure rollers 17a, 17b are mounted in straps 112a, 112b which for their part are swivellable about pivots 113. The pivots 113 are arranged on the head plate 3. The straps 112a and 112b have pins 114 which can travel down the surfaces of the cams 109. The straps 112a and 112b are spring-loaded towards the capstans 18a, 18b with the aid of springs 115a, 115b. The springs 115a and 115b also always press the pins 114 against the cams 109.

Figure 5:
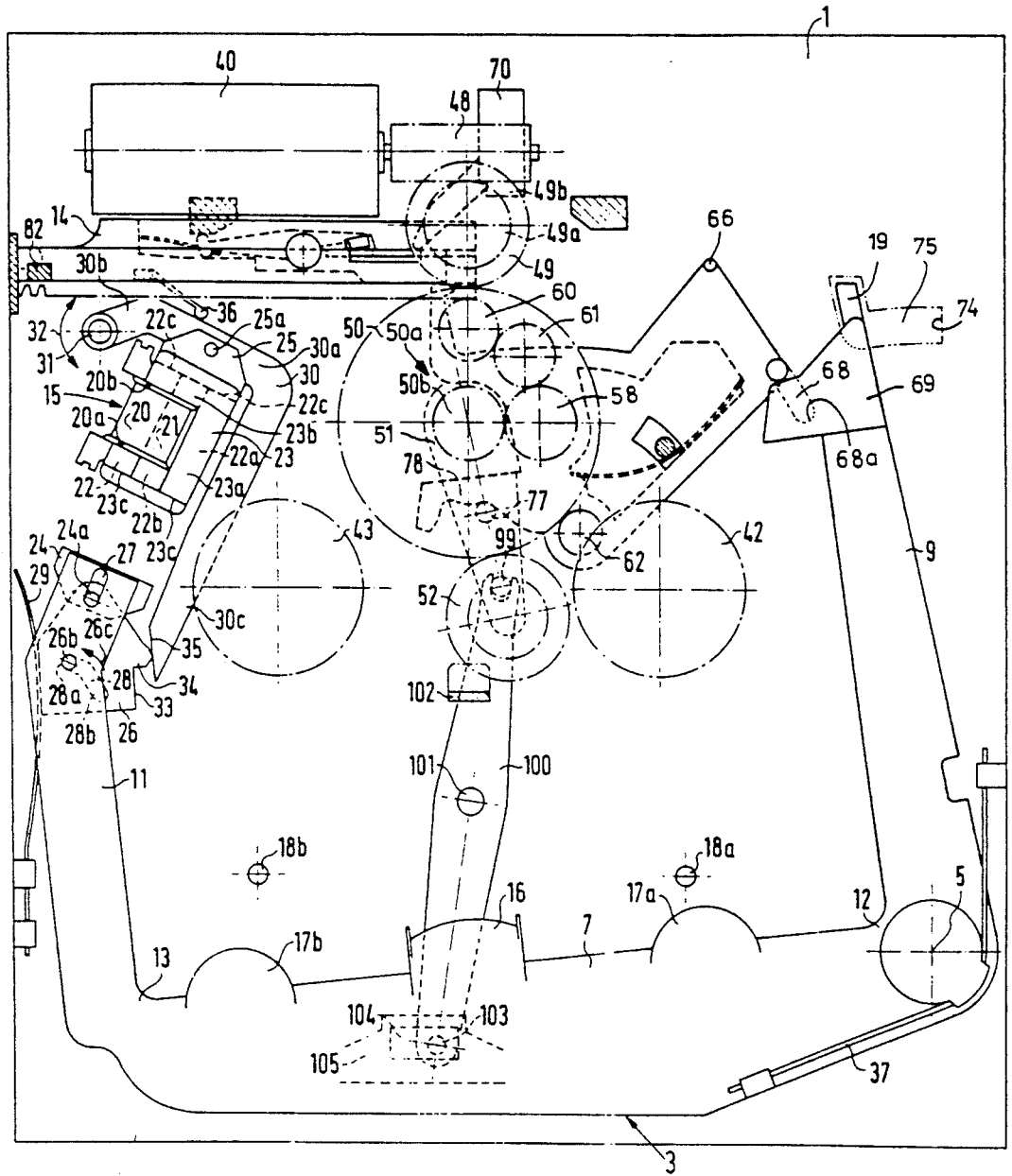
FIG. 5 shows the mechanism of the apparatus in the eject position in schematic representation.
Figure 5A:
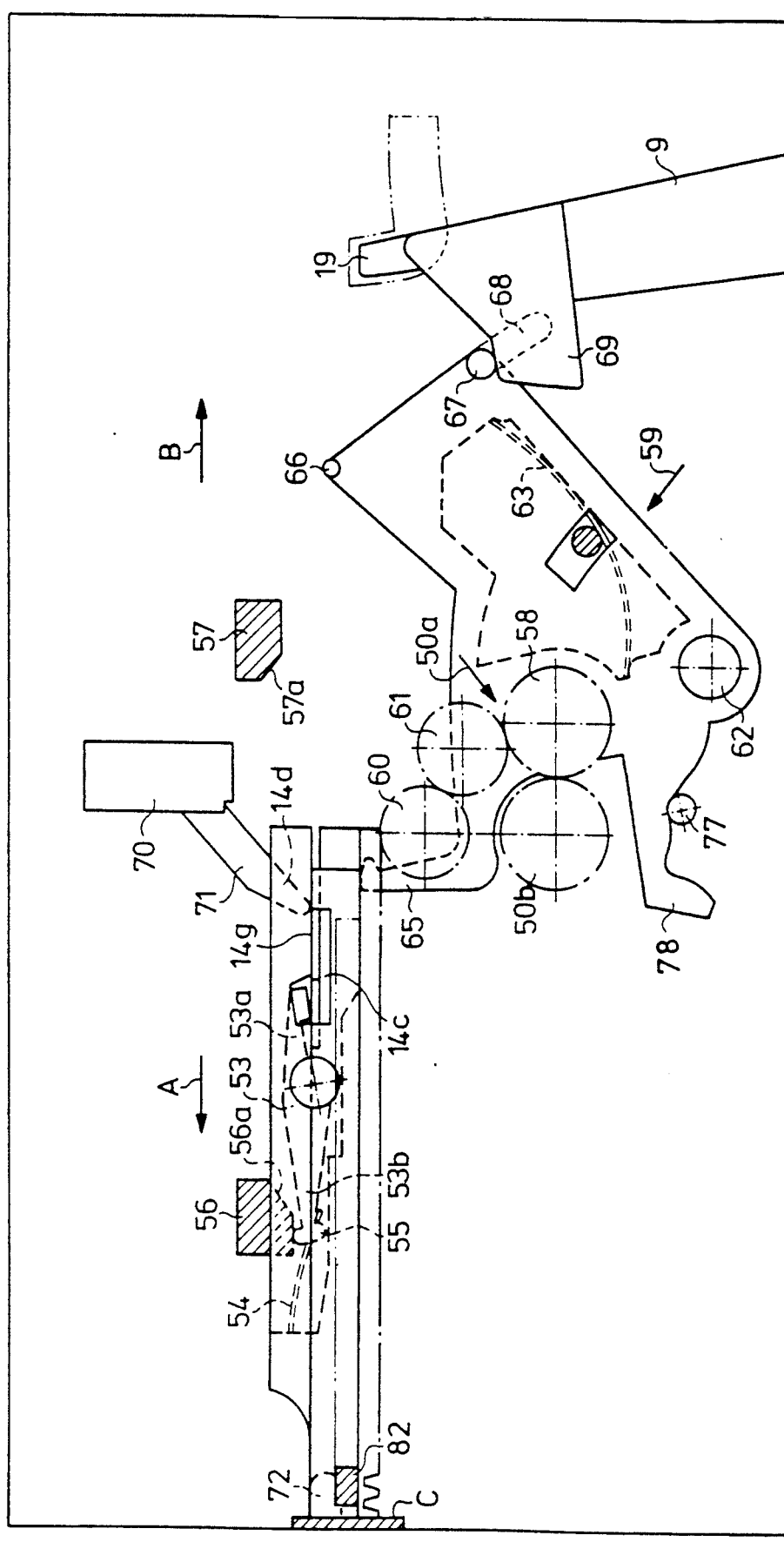
FIG. 5a shows a detail from FIG. 5 featuring the servo mechanism of the apparatus in the eject position.

If there is no cassette 86 in the drive mechanism, then the drive mechanism assume the mutual relative position the individual components illustrated in FIGS. 5 and 5a. If the apparatus is to be put into operation, a cassette 86 is pushed into the lift tray 88. During the manual insertion of the cassette, the coupling member 82 of the lift tray 88 takes the catch rod 14a along with it. The control rod 14 initially remains against a stop on the chassis 1 at its one end point C (FIG. 5a).

In the eject position of the cassette 86 and of the lift tray 88, the switch projection 71 rests swivelled on the catch hook 14g. If the lift tray 88 displaces the catch rod 14a in direction B, the catch hook 14g releases the switch projection 71. This delivers the first pulse to the logic circuit 46, said pulse causing the logic circuit to start the servo motor 40, specifically bringing about fast running with a drive voltage of 12 V and high torque.

In the eject position (FIGS. 5 and 5a) of cassette 86 and lift tray 88, the detent rocker 53 rested by its run-on protrusion 55 on the dog 56. The detent rocker 53 had thus been swivelled in such a way against the action of the spring 54 that the coupling dog 14d had been lifted out of the coupling recess 14c. Control rod 14 and catch rod 14a had thus been uncoupled from one another. It was therefore possible for the catch rod 14a to be moved in the direction of arrow B with the control rod 14 stationary. As the servo motor 40 started (the catch hook 14g released the switch projection 71, whereupon the latter emitted the starting signal to the logic circuit), the run-on protrusion 55 had left the dog 56 via the oblique face 56a and the rocker had coupled the control rod 14 and the catch rod 14a by the falling of the coupling dog 14d into the coupling recess 14c. By way of the servo gear unit 50a comprising gears 50, 58, 60, 61, both rods 14 and 14a are now moved to the right in the direction of the arrow. The switching member 59 holds fast the blocking pin 77 via the blocking fork 78, with the result that the transmission gear 52 meshes with neither of the winding disks.

The drawing in of the cassette can be taken over directly from manual insertion by the coupled control rod 14, 14a. After a certain path length on the draw-in path, the run-on protrusion 55 runs up onto the dog 57 via an oblique face 57a. As a result, the control rod 14 and the catch rod 14a are uncoupled again. The catch rod 14a remains stationary because the lift tray 88 has reached the draw-in end position. However, driven on by the servo gear unit 50a, the control rod 14 travels further to the right until its forward edge 14h strikes against a transport projection 19 of the leg 9 of the head plate 3 and presses the latter until it comes up against one end 74 of a groove 75 in the chassis plate (FIG. 6). At this moment, the control rod dog 72 has swivelled the switch projection 71 so far that the switch 70 can emit a signal pulse to the logic circuit 46. This signal pulse causes a reversal of the direction of rotation of the servo motor 40 in the logic circuit and an attraction of the holding magnet 15. While the control rod 14 travels back in the direction of arrow A, the head plate remains in its playing position by reason of the adhering force of the holding magnet 15. In the meantime, the guiding pin 66 had run up onto the guiding edge 66a. During the return of the control rod 14, the guide pin 66 leaves the guiding edge 66a and the spring 63 swivels the switching member 59 in the clockwise direction until the stop pin 67 reaches the end 68a of the groove 68. During this procedure, the switching member hook 65 has swivelled upwards and strikes against the switch projection 71 of the switch 70. The switch 70 again emits a signal pulse, which indicates that the function comprising the bringing of the head plate 3 into the playing position has been correctly executed and the servo mechanism has been brought into its stand-by position. If the command to undertake a playing operation was present from the beginning, this signal pulse can initiate the starting of the playing operation. For the head plate has remained in the position visible from FIG. 6 due to the adhesion of the holding magnet 15. The playing position of servo mechanism and drive mechanism is illustrated in FIGS. 7 and 7a. During the swivelling of the switching member, further mechanical switching functions have been executed. Thus, the central gear 50 has been separated from gear 58. The servo gear unit was thus switched off. The blocking fork 78 has simultaneously released the blocking pin 77. It was thereby possible for the transmission gear 52 to come to rest against a winding disk 42, with the result that the servo motor 40 now drives the winding disk 42. The servo motor is switched over from 12 V drive voltage to 2 V drive voltage.

If the drive mechanism receives from outside, via a manually pressed function button, the command to stop, the logic circuit switches the holding-magnet device off. This results in the head plate swivelling in the anti-clockwise direction and a head of the head plate 3 urges the switching member 59 back in the anticlockwise direction via a stop pin 69 (FIGS. 8 and 8a). The guiding pin 66 thereby comes up in front of the guiding edge 66a and the fork 64 catches the limiting pin 77, the transmission gear 52 being guided away from the winding disk 42, 43 being driven at that particular moment. Gear 60 of the servo gear unit comes into engagement with the toothing 14e of the control rod 14. The switching transmitter 65 on the switching member 59 has swivelled away from the switching projection 71 of the switch 70. A switching pulse emitted by the switch 70 as a consequence of the swivelling away is interpreted by the logic circuit 46 as a command to switch off the servo motor 40 and the capstan motor 41. The logic circuit 46 switches off both motors 40, 41. The apparatus is in its stand-by position.

Figure 9:
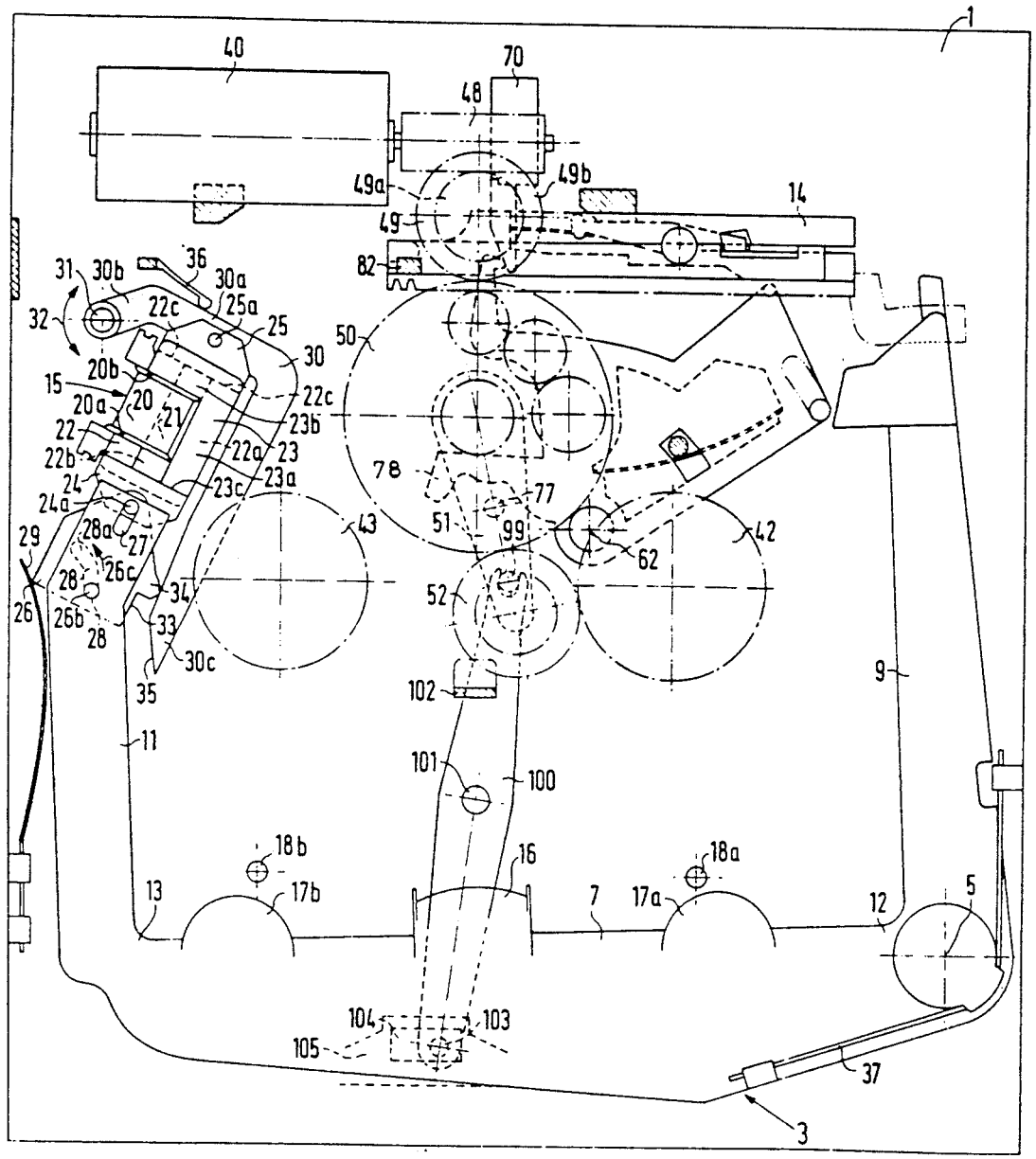
FIG. 9 shows the mechanism according to FIG. 5 in the fast-winding position.
Figure 9A:
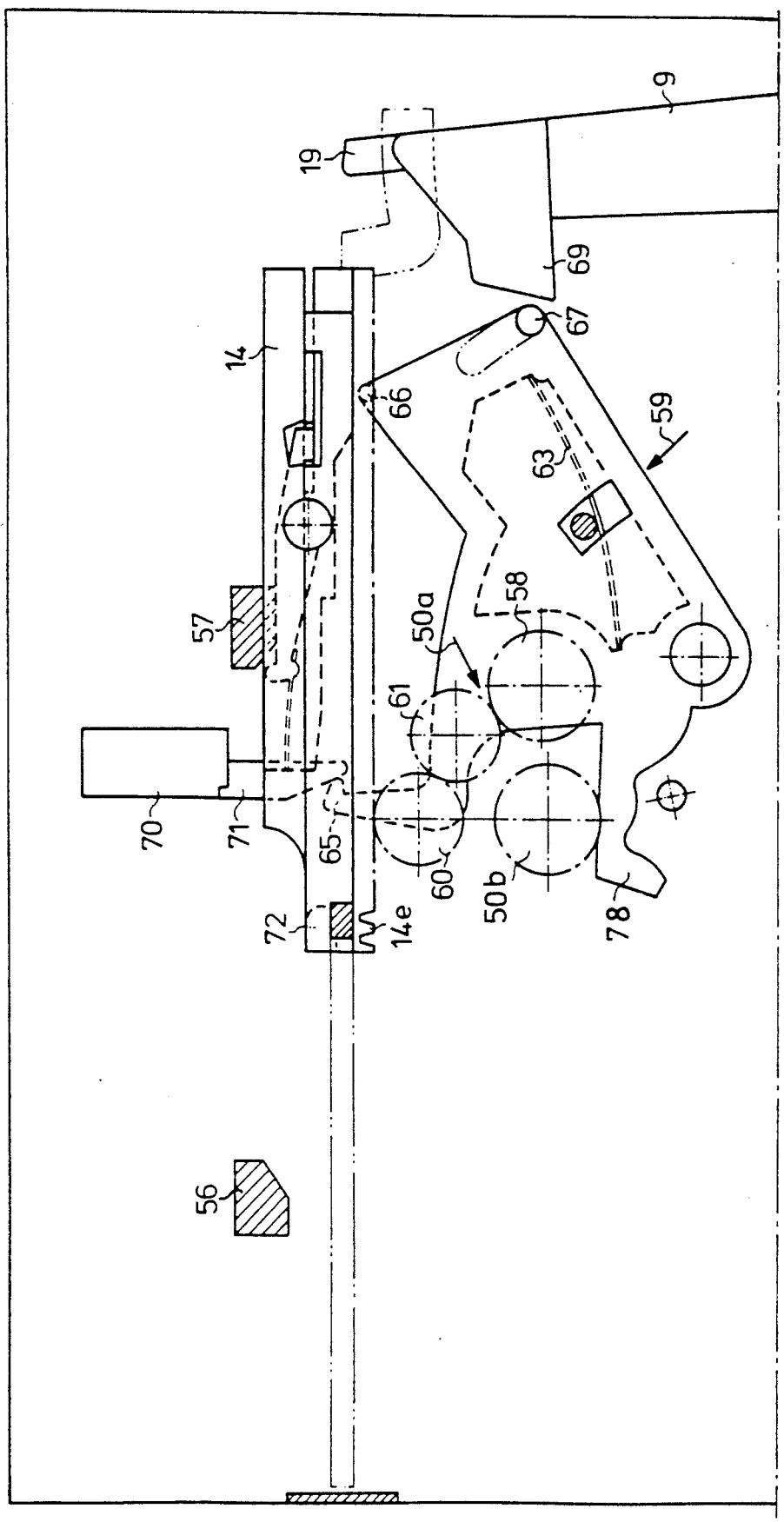
FIG. 9a shows a detail from FIG. 9, with the servo mechanism in the fast-winding position, FIG. 10. shows a second embodiment of a loading mechanism in diagrammatic representation.

It is possible to make a direct transition from the stand-by position to the playing position. By manually pressing an external function button, the servo motor is switched to 12 V operating voltage. The servo gear unit drives the head plate 3 into the playing position via the transport projection as far as the stop (FIG. 6). A control pulse of the switch 70 is recognised by the logic circuit as a signal to reverse the direction of rotation of the servo motor 44 and to switch on the holding-magnet device 15. The control rod 14 travels back until the guiding edge 66a releases the guiding pin 66 and the switching member swivels in the clockwise direction under loading by the spring. The switching transmitter 72 initiates the control signal to switch back the servo motor 40 to 2 V and to switch on the capstan motor 41. The blocking fork 78 releases the limiting pin 77 and the transmission gear 52 moves up against the respective winding disk 42, 43 for the purpose of driving. During the swivelling of the switching member 59, the servo drive was uncoupled from the toothing 14e of the control rod 14 (FIGS. 9 and 9b). The drive mechanism runs in playing mode.

The switching over of the drive voltage of the servo motor between 2 V and 12 V is important since a high torque is required during the execution of servo functions. During the driving of the winding disks 42, 43 in playing mode, only a low torque is required.

A pressure-roller displacement has occurred simultaneously with the transposition from the stand-by position to the playing position. Due to the release of the limiting pin 77, the adjusting lever 100 has displaced the slide 105 to the left in the direction of an arrow 120 (FIG. 7). Via the toothed segments 110, the racks 111 have rotated the cams 109 in the clockwise direction. During this procedure, the pin 114 of the strap 112a on the right has left the surface 121 of the cam 109 and has run up against an edge 122, the spring 115a pressing the pin 114 continuously against the edge 122. The pressure roller 17a has thus simultaneously been placed against the capstan 18a. The running off of the pin 114 from the surface 121, via a corner 123, to the edge 122 has simultaneously resulted in the displacement of the slide 105 in the direction of the arrow 120, previously initiated by the adjusting lever 100, now being assumed by the pin 114. While the pin 114 of the right-hand cam 109 has now run up onto the lower edge 122, the pin 114 of the left-hand cam 109 has now run off the edge 122, via the corner 123, onto the surface 121. This has had the effect of the strap 112b being pivoted in the clockwise direction counter to the force of the spring 115b and the pressure roller 17b lifting off from the capstan 18b. In parallel with this, pressure roller 17a has come to rest against capstan 18a. The tape-running direction has thus been reversed.

The control of the apparatus is always effected via the logic circuit 46. All control commands from outside pass via the buttons or the like and all internal control commands pass from the switch 70 to the logic circuit. If the running direction of the apparatus is to be reversed, then either at the end of the tape or by means of a button, via the logic circuit, the motor 40 is given the command to reverse its direction of rotation. This reversal of the direction of rotation has the effect, at the parts used for tape transport, that the adjusting lever 100 first of all adjusts the slide 105 in the direction of an arrow 124 until, at the left-hand cam 109, pin 114 has run over the edge 123 and pin 114 has then assumed, via the edge 122, the further displacement of the slide 105 in the direction of the arrow 124. During this procedure, pressure roller 17a has come away from capstan 18a while pressure roller 17b has moved up against capstan 18b. The transmission gear 52 has simultaneously swivelled over from winding disk 42 to winding disk 43.

If the playing mode is to be ended, this being achievable, for example, by button pressing or an interruption in the operating voltage, the holding-magnet device 15 is de-excited and the head plate 3 swivels in the anti-clockwise direction under the action of the spring 37.

Figure 10:
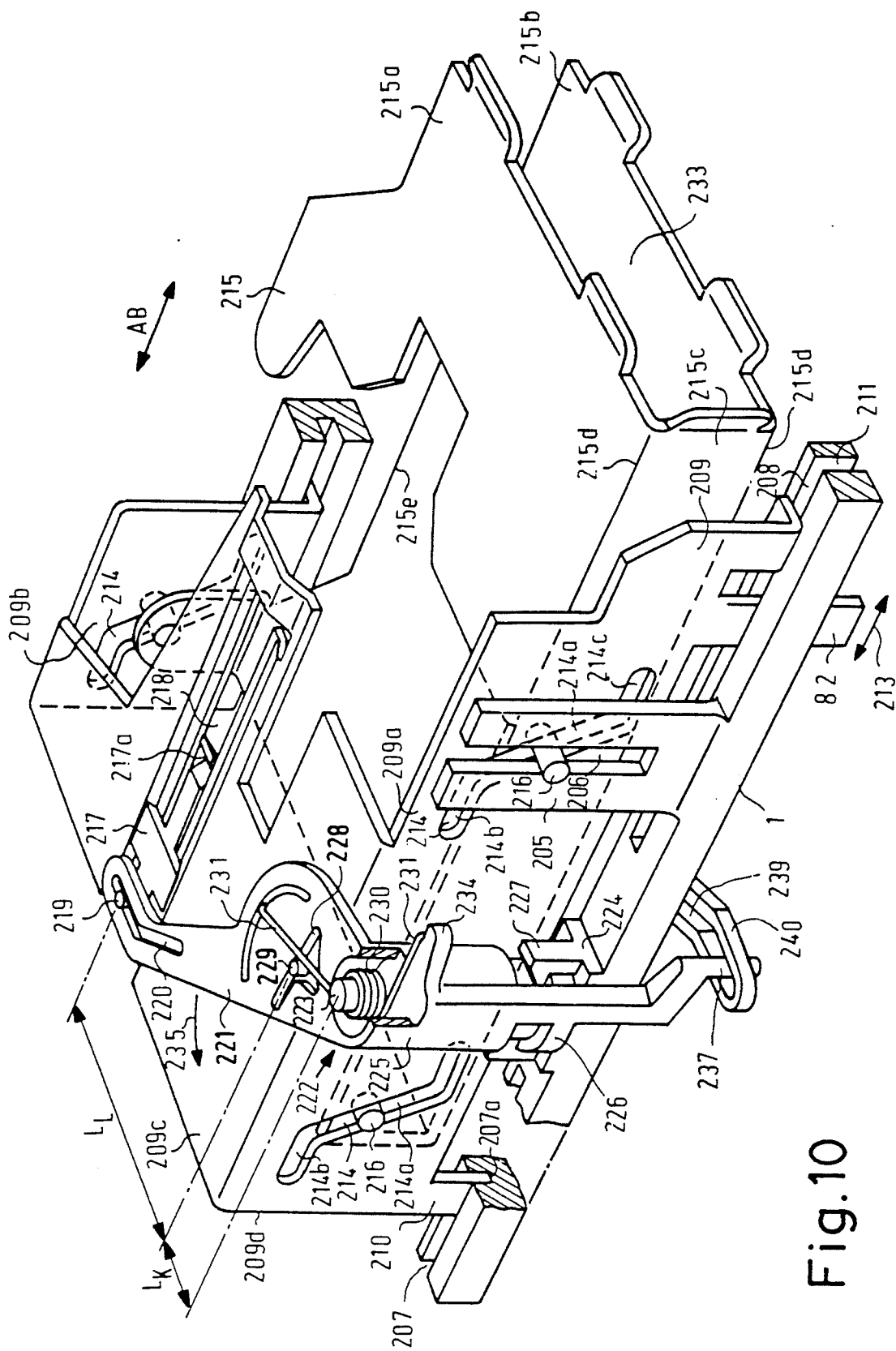

In FIG. 10, a second embodiment of a loading mechanism is illustrated diagrammatically. This loading mechanism is constructed on the chassis plate 1. At least one vertical supporting plate 205 provided with a vertical supporting-plate slot 206 is provided on the chassis plate 1. Guideways 207 and 208, which guide a slide 209 vertically in the draw-in and eject direction AB so that it rests against the vertical supporting plate 205, are provided in the chassis plate 1. Guideway 207 consists of a groove 207a in which a web 210 of the slide 209 is displaceable in the displacement direction AB. Guideway 208 consists of a slot 211 in the chassis plate 1, a coupling web 82 of the slide 209 reaching through said slot. The coupling web 82 can be pushed backwards and forwards in the direction of a double arrow 213. The direction of movement corresponds to the draw-in and eject direction AB.

The slide is provided with at least two lift slots 214 on the front side of the illustration. A third lift slot 214 can be arranged on the opposite side of the slide. Each lift slot 214 comprises a central part 214a which slopes relative to the vertical course of the supporting-plate slot 206 by a certain angle of inclination of, for example 8°. All central parts 214a slope by the same angle of inclination relative to the vertical. The sloping upper ends of the central parts 214a of the lift slots 214 are adjoined by essentially horizontal rearward slot ends 214b which run towards the rear side of the mechanism and ensure an overstroke tolerance for the eject movement of the slide. The lower ends of the central parts 214a are adjoined by forward slot ends 214c which slope forwards in the lowering direction and ensure an overstroke tolerance for the end of the draw-in movement.

In addition to its forward, vertical slider-plate part 209a, the lift slide has a rearward, vertical plate part 209b. Both plate parts 209a and 209b are connected via at least one essentially horizontally lying slide connecting plate 209c. In addition, a backplate connecting the rear edges can likewise be pivoted at the rear edges 209d.

A cassette tray 215 is arranged between the slide plate parts 209a and 209b. This cassette tray 215 essentially comprises two guide plates 215a, 215 which are arranged at a distance one above the other in horizontal planes and are connected via longitudinal edges 215d by means of guiding plates 215c. The guiding plate 215c illustrated at the front has two pins 216 which protrude laterally from it and reach through the lift slots 214. A third pin 216 engages in the third slot 214 of the slide 209 in plate part 209b. In the forward part of the loading mechanism, the pins 216 reach through the lift slot 214 and the supporting-plate slot 206. The cassette tray 215 is moved up and down by sliding the slide 209 backwards and forwards by means of the coupling web 212.

A cassette catch 217 which is guided in a guiding slot 218 of the slide connecting plate 209c serves for drawing in and ejecting a cassette. The guiding slot 218 extends in the direction of the double arrows 213 and AB.

The cassette catch 217 is provided with a driver pin 219 which reaches through a slot 222 of an actuating lever 221. This actuating lever 221 has a bearing 222. This bearing 222 comprises an upright dome 223 which is provided on a support 224 connected to the chassis plate 1. Preferably, it is an injection-moulded part integrally moulded onto the chassis plate 1. Around the dome 223 there extends a bearing sleeve 225 which is part of the actuating lever 221. At its lower end, the bearing sleeve 225 has a collar 226, over which a retention hook 227 of the support 224 engages.

In the actuating lever 221 there is a guiding slot 228 through which a coupling pin 229 arranged on the slide connecting plate 209a reaches.

The dome 223 is situated to the side of the slide 209. The coupling of the slide to the actuating lever 221 via the coupling pin 229 produces two lever arms $L_k$ and $L_l$ of different lengths, which are of significance for the displacement path of the cassette catch 217. Even short slide movements bring about long displacement paths of the cassette catch 217.

A return spring 230 is first of all placed on the dome 223 in the upper part of the bearing 222. The sleeve 225 of the actuating lever 221 reaches beyond this return spring 230, which is designed as a helical spring. The helical spring has an end arm 231 and 232 at each of its ends. As seen from the insertion side 233 of the cassette tray 215, the end arm 231 rests against the coupling pin 229. The other end arm is supported on a side arm 234 of the bearing sleeve 225. The arrangement here acts as return arrangement for the cassette if the draw-in mechanism of the magnetic tape apparatus does not respond.

The cassette loading mechanism operates as follows: a magnetic tape cassette 86 is pushed into the insertion side 233 of the cassette tray 215. The pins 216 of the cassette tray 215 are situated in the rearward slot ends 214b of the lift slots 214. The winding spool-opening, situated at the front in the insertion direction, of the inserted cassette (not shown) travels under a gripping hook 217a of the cassette catch 217 until the latter drops into the winding-spool opening of the cassette. As pushing in continues, the cassette catch then takes the actuating lever along in the direction of an arrow 235. At this point in time, provision is made for the draw-in mechanism of the magnetic tape apparatus to be switched on and for the latter to take the coupling web 82 in the draw-in direction. If the draw-in mechanism is put into operation and the slide 209 travels towards the rear, the coupling pin 229 also travels towards the rear. The slide can thus travel as far as its rearward end position, the cassette tray 215 being lowered in the lift slots 214 via the pins 216.

If the loading mechanism does not respond and the slide 209 thus stops in its starting position, the coupling pin 229 also stops and the helical spring 230 is tensioned between the coupling pin 229 and the side arm 234 as the cassette is pushed in by hand. As a consequence, the actuating lever 321 pushes back the cassette as soon as the insertion force ceases. This insertion force is exerted by the hand of the user. In the case of an apparatus fault, the cassette can thus never disappear inside the tray.

Figure 11:
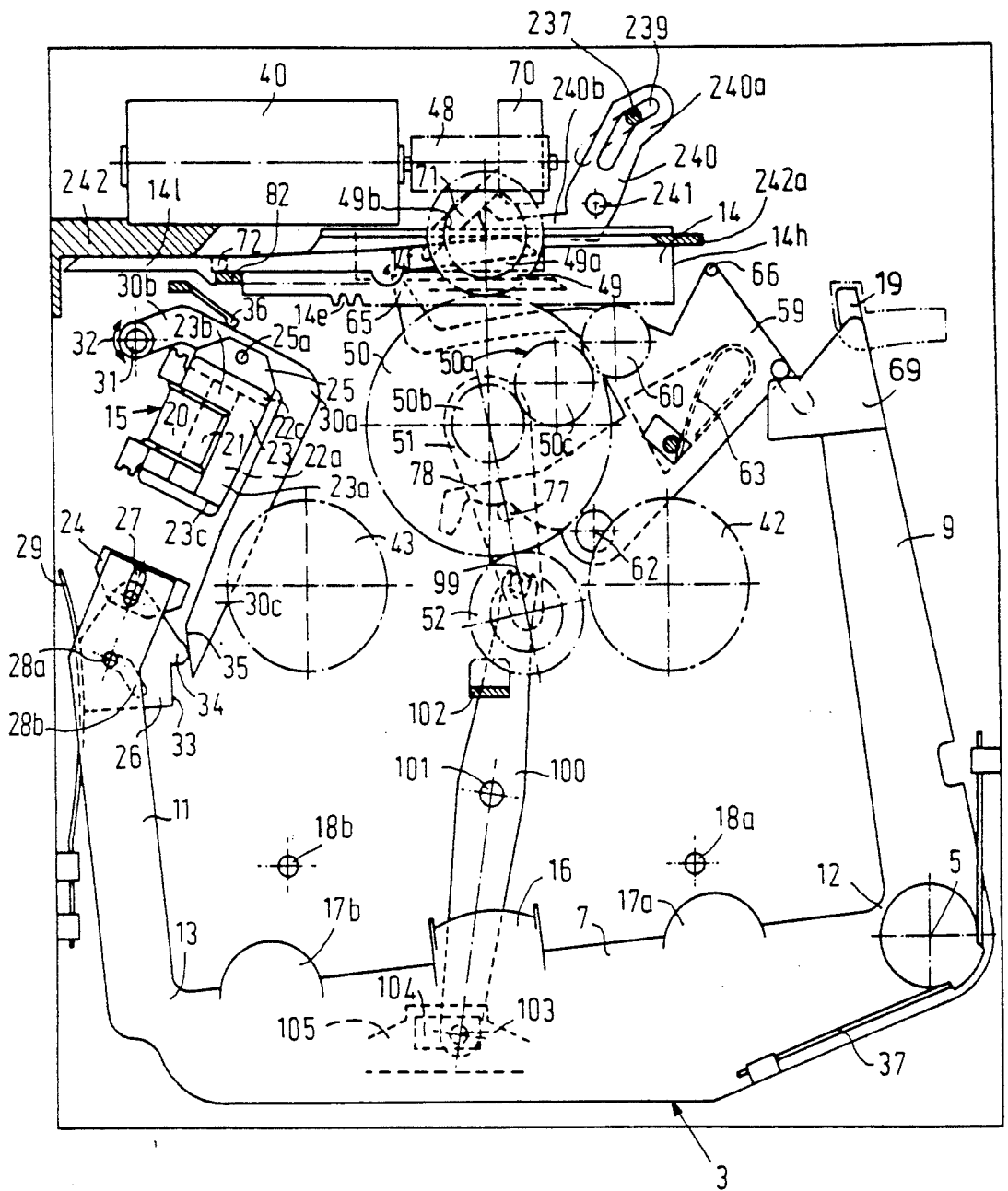
FIG. 11 shows another embodiment, belonging to the loading mechanism according to FIG. 10, of the apparatus mechanism.

As FIG. 10 shows, an operating pin 237 which, on the other side of the chassis plate 1, engages in a driving slot 239 of an operating lever 240 is arranged on the sleeve 225. As FIG. 11 shows, the operating lever 240 can be swivelled about a pivot 241. The operating lever 240 is a double-armed lever having a first lever arm 240a, in which the operating pin 237 engages, and a second lever arm 240b, which bears a contact piece 241 which can act on the switching projection 71.

FIG. 11 shows the second embodiment of the apparatus servo mechanism, many parts of which correspond to the mechanism according to FIGS. 5 to 9. For this reason, parts having the same function are provided with the reference numerals of FIGS. 1 to 9. As in FIG. 5, the servo motor 40 drives the central gear 50 and, via the latter, the servo gear unit 50a. The control rod 14 can swivel the head plate 3 in the clockwise direction and the switching projection 71 of the switch 70 can, in the swivelling end position, cause the attraction of the holding-magnet device. When the control rod runs into the playing position, a switching member 59 ensures not only the actuation of the switching projection 71 but also the switching over of the servo gear unit 50a from driving the control rod to driving the winding disks.

Figure 12:
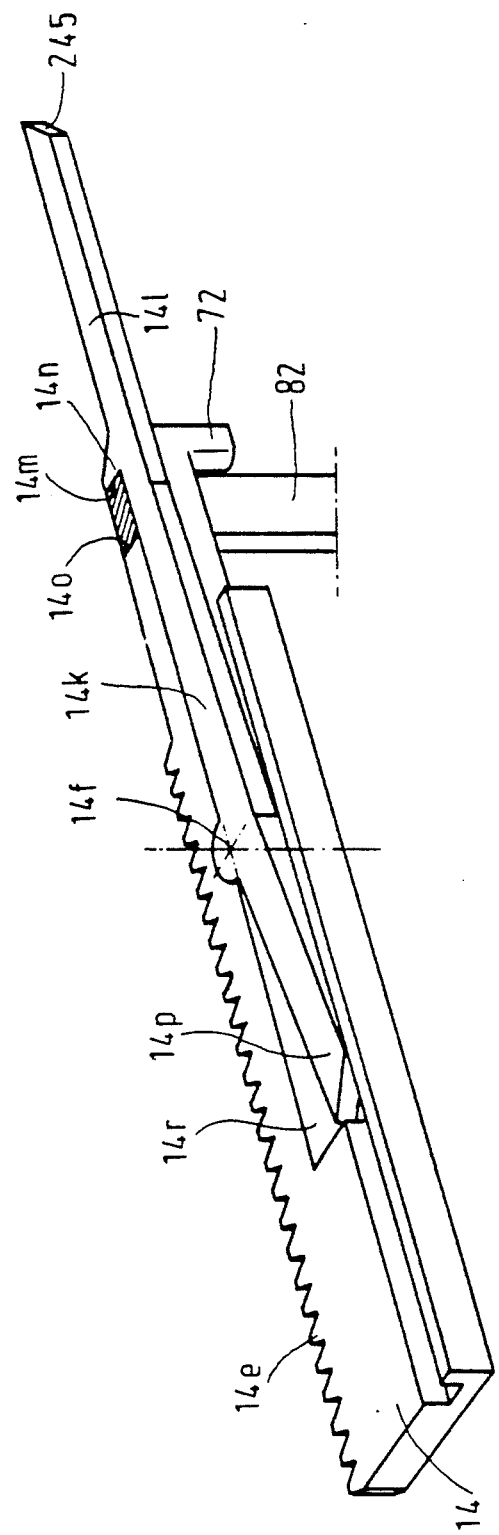
FIGS. 12 and 13 show diagrammatic representations of a control rod belonging to the apparatus mechanism according to FIG. 11, with associated catch rod.
Figure 13:
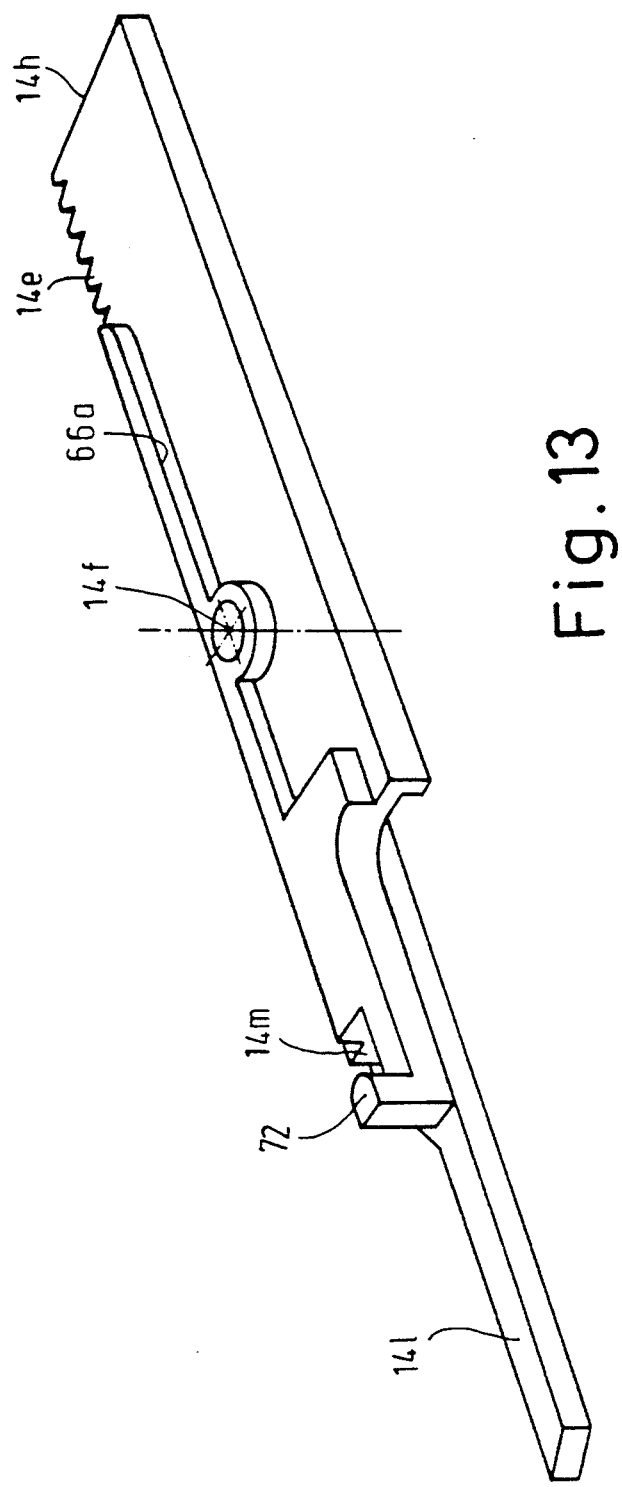

As FIGS. 12 and 13 show, the control rod 14 is provided with a toothing 14e. A catch rod 14k is mounted on the control rod so as to be swivellable about an axis 14f. The catch rod 14k is provided with an extension 14l which protrudes clearly beyond the control rod 14 in the draw-in direction, essentially in the longitudinal direction. A coupling projection 14n which, in the coupling position illustrated in FIG. 12, is at a distance from an end face 14o of the control rod 14, is situated on the catch rod 14k to form a catch pocket 14m, the pocket 14m being formed between the coupling projection 14n, the end face 14o and the control rod 14. The extension 14l interacts with guides 242 arranged on the drive mechanism in such a way that these guides 242 swivel the catch rod 14k for catching the coupling member 82 in the pocket 14m or releasing it from said pocket. To achieve a certain reliability of guidance, the catch rod 14k is designed to be resilient in the longitudinal direction. An excessive deflection in a direction towards a disintegration of the catch pocket 14m is prevented by a lever arm 14p of the catch rod 14k, said lever arm 14p running up against a wall 14r of the control rod 14 in the case of swivelling in the clockwise direction (according to FIG. 12). A dog 72 which, in the end position to be described later, of the control rod 14, in which the head plate is pressed into its playing position, presses against the switch projection 71 is provided on the control rod 14. Of the servo gear unit 50a, the switching member 59 carries only gear 60, which can be brought into engagement with the toothing 14e of the control rod 14. The servo gear unit 50a overall comprises a pinion 50b arranged on the shaft of the central gear 50, an intermediate gear 50c mounted rotatably on the chassis 1, the gear 60 on the one hand, which is mounted on the switching member 59 and is used for the servo drive, and the transmission gear 52, which serves to drive the winding disks. The switching member 59 for its part is pivotable about a pivot 62 and is loaded in the clockwise direction with the aid of a spring 63. A switching member hook 65 which can act on the switch projection 71 is arranged on the switching member 59.

Figure 14:
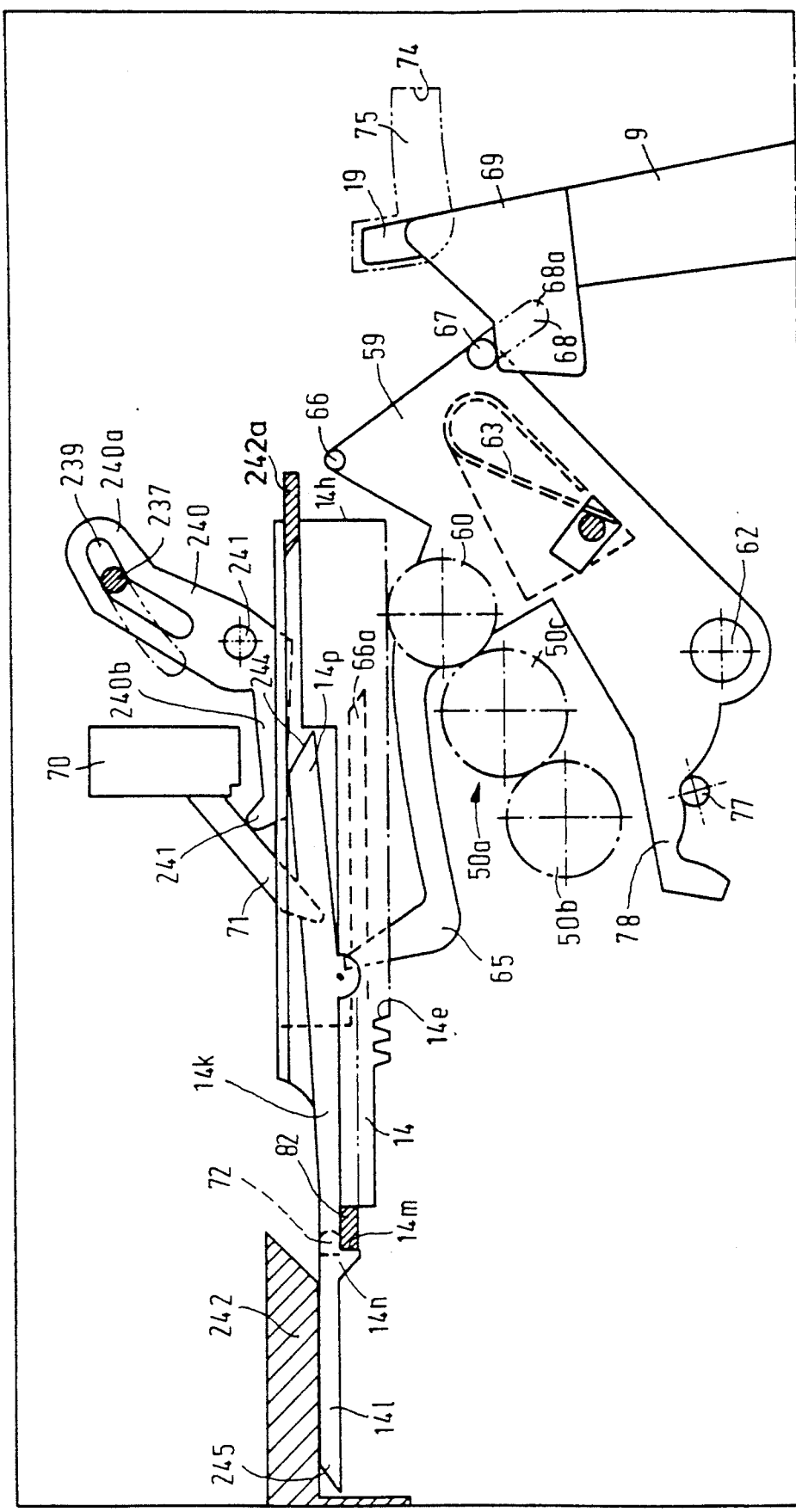
FIG. 14 shows the servo mechanism according to FIG. 11 in the eject position.

FIGS. 11 and 14 show the servo mechanism in the same position, specifically in the eject position, in which there is no cassette 86 in the cassette tray 215. If the drive mechanism is to be started, a cassette 86 is pushed into the slot 233. After a certain insertion movement, the spring strap 217a of the cassette catch 217 snaps into the first winding hole of the cassette. The cassette catch device 217 is then pushed backwards together with the manually pushed-in cassette, and the actuating lever 221 swivels in the direction of the arrow 235. As a consequence, the sleeve 225 also rotates in the anticlockwise direction in the direction of the arrow 235 and the operating pin 237 swivels the operating lever 240 about the operating lever pivot 241, likewise in the anticlockwise direction. The contact piece 241 on the second lever arm 240b thus moves away from the switching projection 71 and the switching projection 71 follows the contact piece 241 automatically until it stops in its central position predetermined by the switch 70. At the instant when it stops, the switch 70 emits a pulse to the microprocessor 46, which causes the servo motor 40 to be started. The servo motor 40 thus rotates the central gear 50. This central gear 50 in turn rotates the pinion 50b, the intermediate gear 50c and the gear 60 in engagement with the toothing 14e. The control rod 14 is thus moved to the right out of the position according to FIGS. 11 and 14. The switching member 59 holds the servo gear unit 50a in engagement with the toothing 14 because the stop pin 67 on the switching member 59 rests on the head 69 of the head-plate leg 9.

From FIG. 14 it can be seen that the extension 14l of the catch rod 14k is loaded in the clockwise direction by the guide 242, with the result that the coupling member 82 is caught in the pocket 14m. If, with the servo motor voltage switched up to 12 V, the control rod 14 now travels to the right, a deflector edge 244 of the catch rod part 14p runs up onto the guide 242a. As a result, as can be seen from FIG. 16, the catch rod 14k tilts over and releases the coupling member 82.

The control rod 14 now travels further to the right and its forward edge 14h finally strikes against the transport projection 19 of the head plate 9. Prior to this, the guiding pin 66 has run up onto the guiding edge 66a, the switching member 59 thereby being prevented from swivelling in the clockwise direction. At the instant at which the transport projection 19 of the head plate 9 has been pushed into the playing position, the control rod dog 72 has also swivelled the switching projection 71 of the switch 70 and pressed it against the contact piece 241. The switch 70 has thus once more emitted a signal to the microprocessor 46, which for its part causes the servo motor to reverse its direction of rotation.

Figure 15:
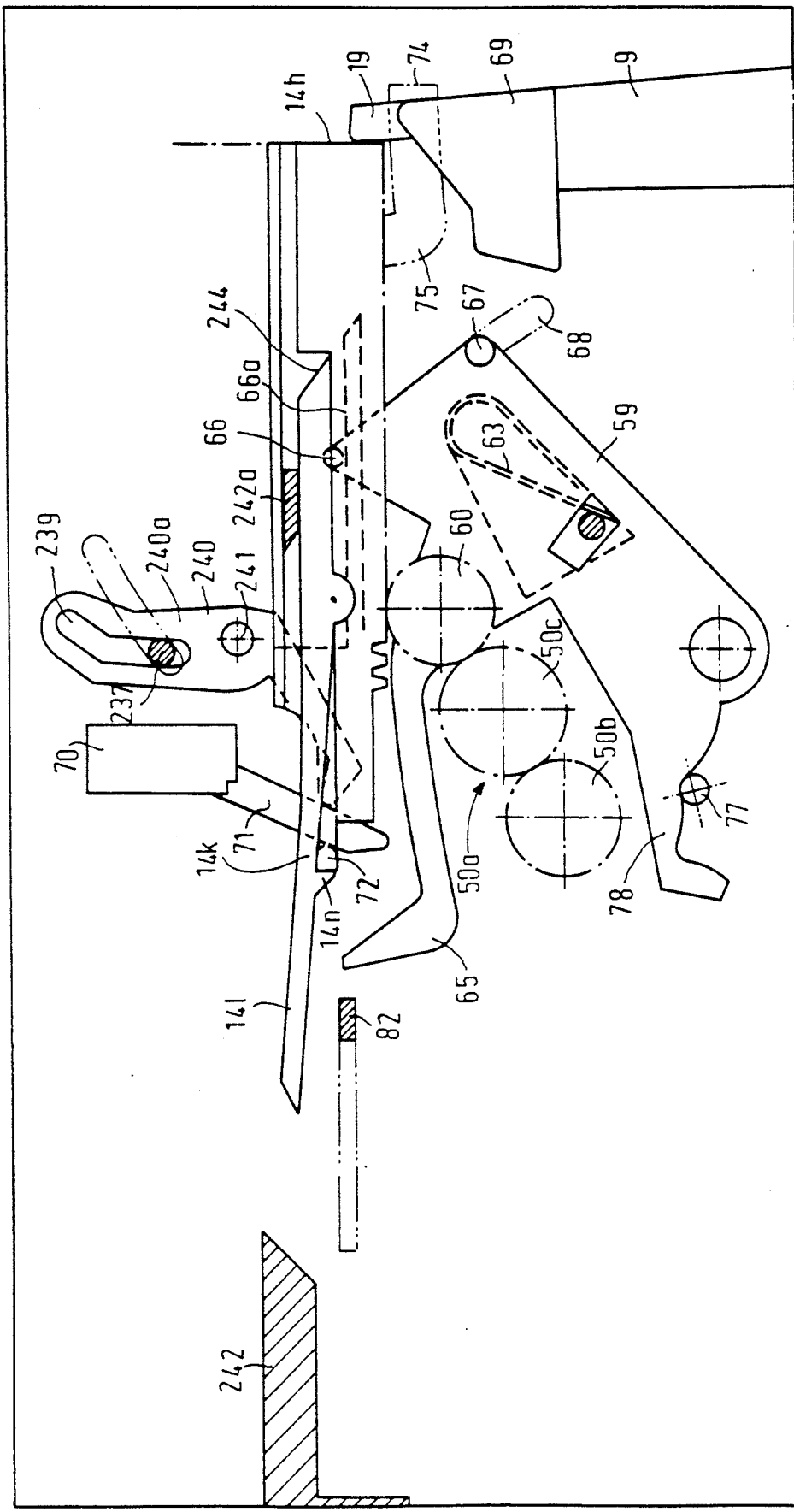
FIG. 15 shows the servo mechanism according to FIG. 11 in a position in which the control rod, upon reaching the end point of the draw-in movement path, has brought the head plate into the playing position.
Figure 16:
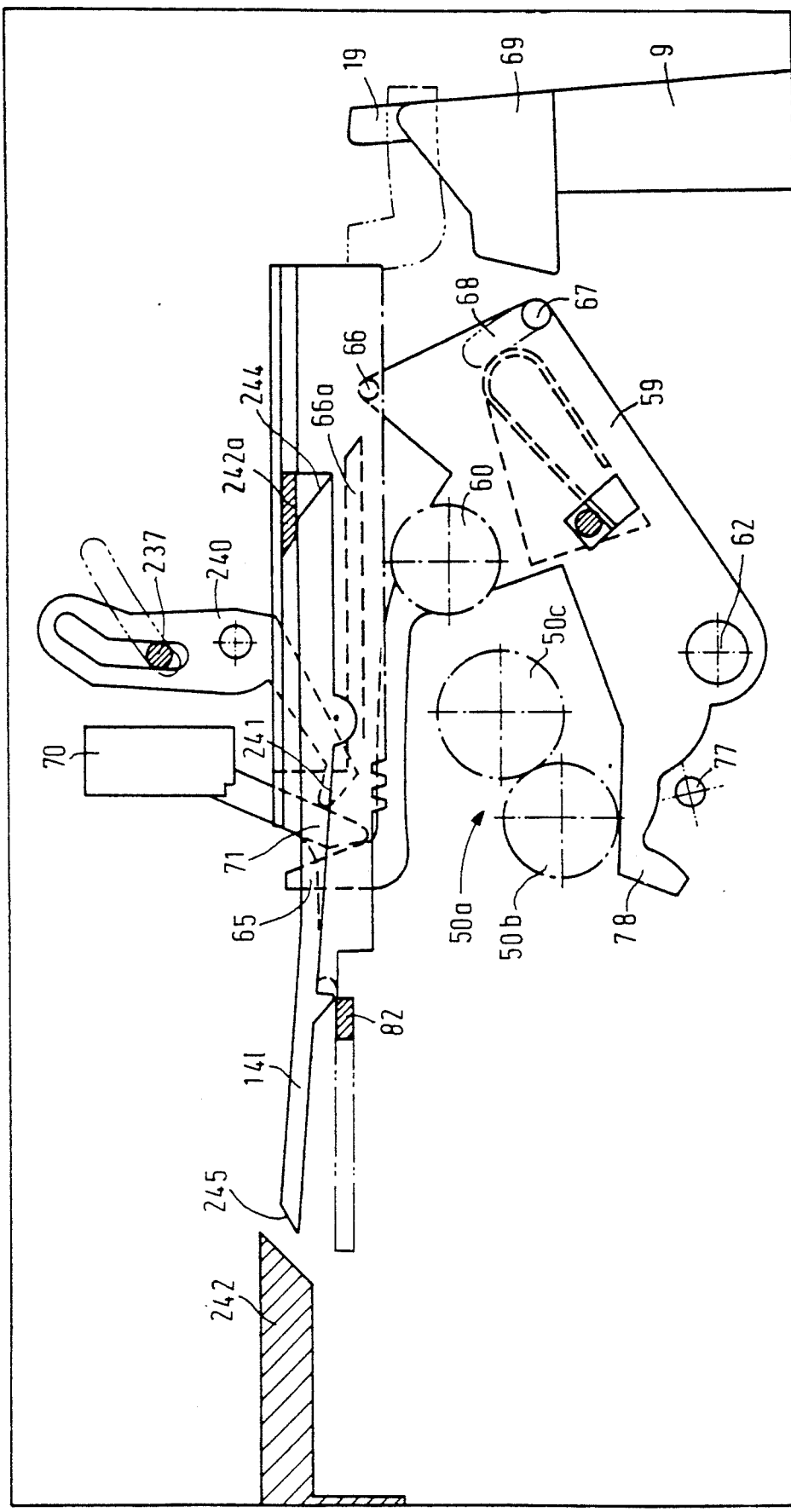
FIG. 16 shows the servo mechanism according to FIG. 11 in the playing position.
Figure 17:
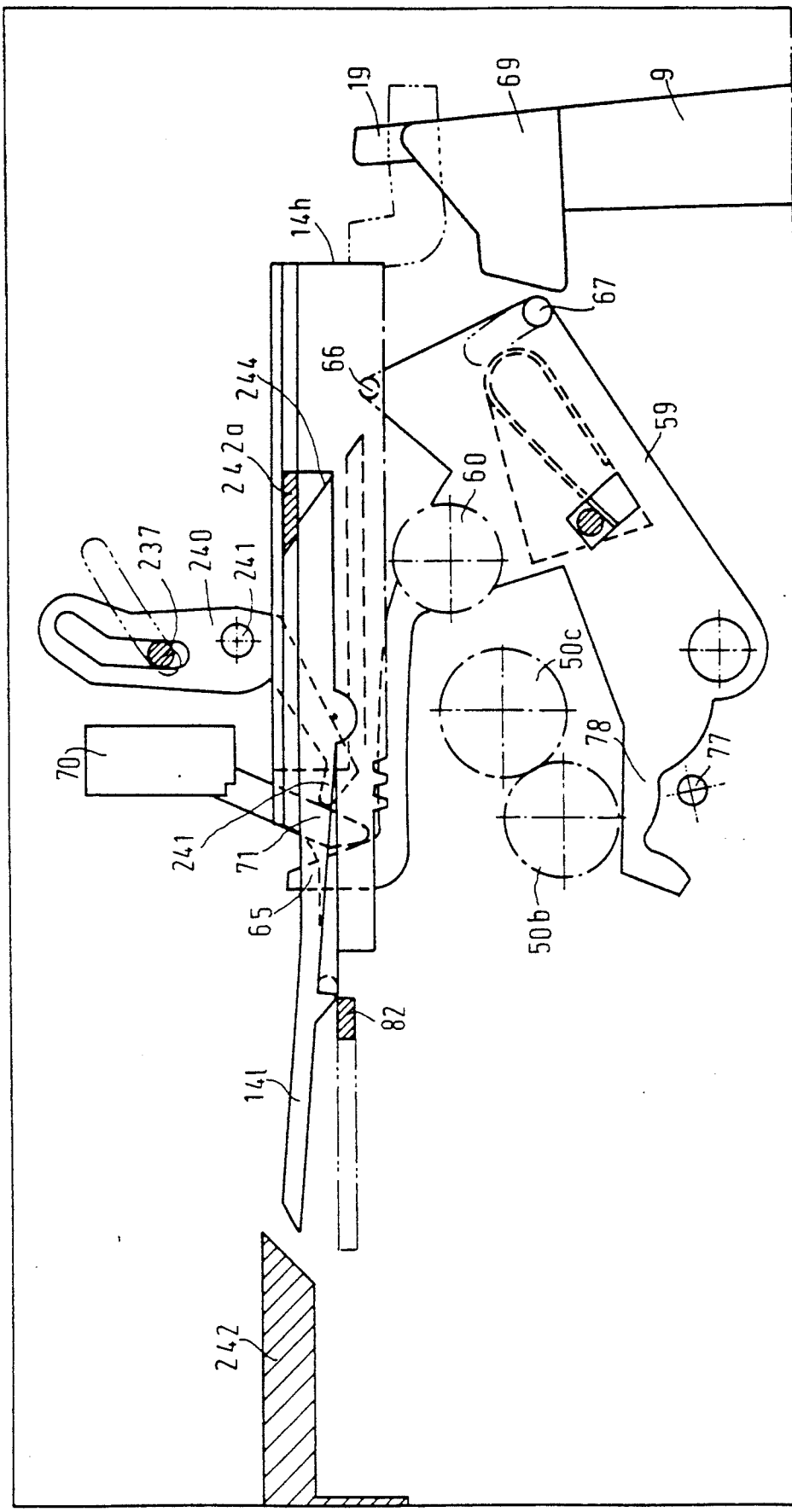
FIG. 17 shows the servo mechanism according to FIG. 11 in the fast-winding MS position.

From the position according to FIG. 15, in which the head plate has been pushed into the playing position and the holding-magnet device simultaneously now holds the head plate fast in the playing position, the servo motor 40 drives the control rod 14 back to the left into a position which can be seen from FIG. 16. Since, during the bringing of the head plate into the playing position, the head 69 of the leg 9 has travelled to the right as well, the stop pin 67 has lost its support on the head 60. This is initially without significance since the switching member rests by its guiding pin 66 on the guiding edge 66a and thus remains secured against swivelling. This safeguard is maintained until—as the control rod 14 travels further to the left—the guiding pin 66 runs off the guiding edge 66a. The switching member 59 is thereby free to swivel and swivels in the clockwise direction to the extent that this is permitted by the slot 68 in the chassis plate 1.

The swivelling of the switching member 59 has had three effects. Firstly, gear 60 has moved out of the position of engagement with the toothing 14e. Secondly, the blocking fork 78 has released the blocking pin 77, with the result that the transmission gear 52 could then come to rest against one of the winding disks 42 or 43. Thirdly and finally, the switching member hook 65 has once more struck the switching projection 71 of the switch 70, so that the switch 70 was once more able to emit a signal to the microprocessor. Due to this impact, the microprocessor switches on the drive motor 41 for the capstans and switches the servo motor over from 12 V to 2 V. The adjusting lever 100 has simultaneously placed the desired pressure roller against the now revolving capstan associated with it.

Music search (MS) does not require any change of the servo mechanism out of the position according to FIG. 16. Music search is achieved exclusively via the holding-magnet device, the slightly tilting head plate being immediately recaptured and held fast. Only when music search is ended is the servo motor 40 switched on again and the control rod 14 pressed against the transport projection 19 until the head plate has once again reached its playing position and the holding-magnet device 15 has carried out holding fast in the playing position.

Figure 18:
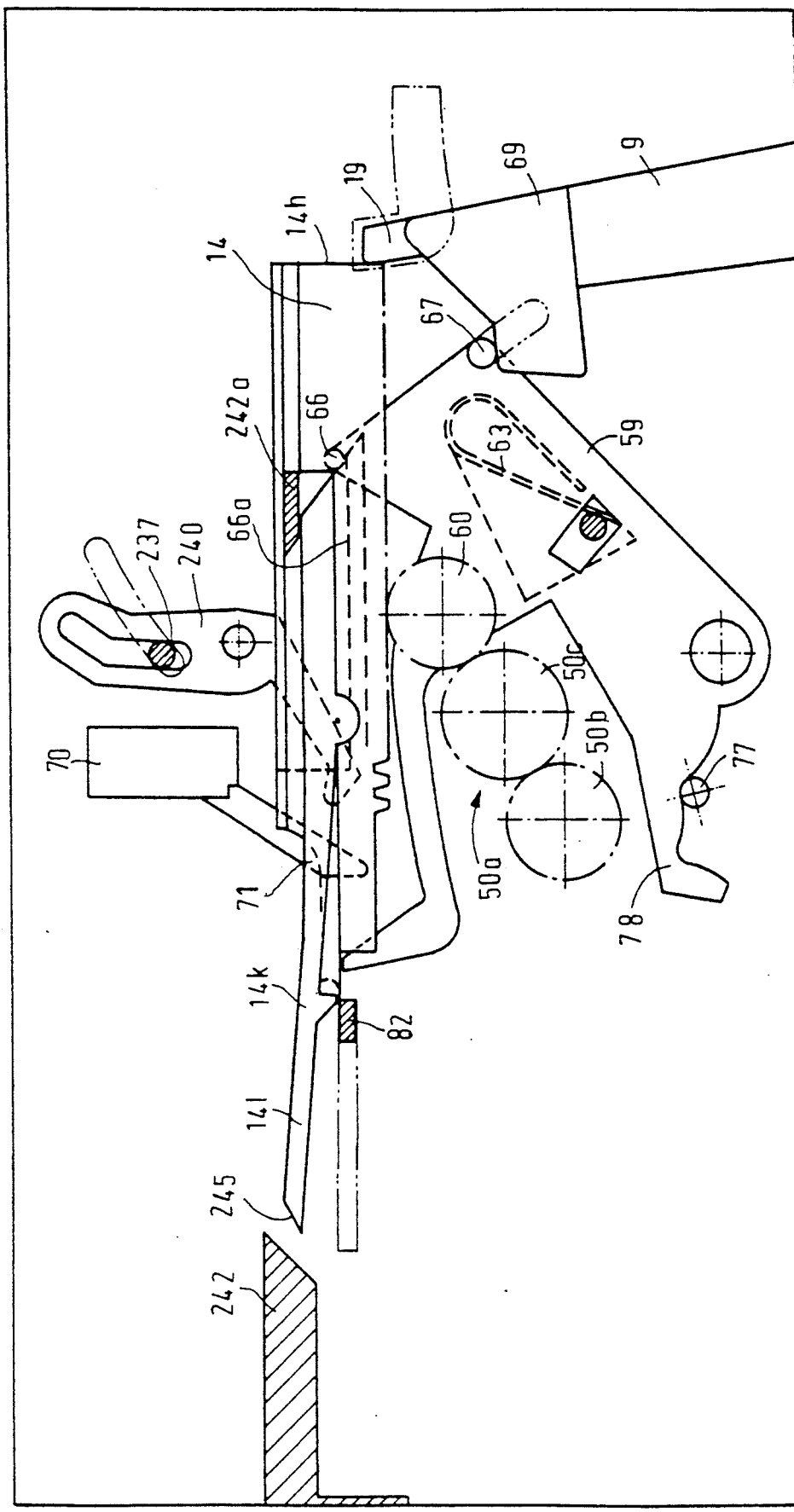
FIG. 18 shows the servo mechanism according to FIG. 11 in the stand-by position.

If the cassette playing procedure is ended, for example by pressing a button, then, after a de-excitation of the holding-magnet device 15, the head plate falls away and reaches the position visible from FIG. 18. In this so-called stand-by position, the winding disks are uncoupled since the blockink fork 78 has swivelled the swivel arm via the blocking pin 77 in such a way that the transmission gear 52 has been pressed out of its engagement in one of the winding disks. The cassette is still inserted and the playing procedure can be set in motion again by means of a pushbutton command, the control rod 14 being driven fully to the right, as in FIG. 15, until the head plate is in its playing position again. If the cassette is to be ejected from this stand-by position, then an eject command issued by the microprocessor starts the servo motor 40, and the servo gear unit 50a drives the control rod 14 to the left. As a consequence, the arm 14p of the catch rod 14k is released by guide 242a and, by a pressure on the free end 245, guide 242 has recaptured the coupling member 82 in the pocket 14m. The coupling member 82 is now moved in the eject direction, the cassette tray 250 rises and the pin 229 moves the actuating lever 221 in the eject direction. The cassette catch 217 then pushes the cassette in the eject direction until, finally, the latter can be removed by hand.

We claim:
1. A magnetic tape apparatus, comprising:
  a loading mechanism for loading and ejecting a cassette from said apparatus;
  a drive mechanism including a motor, an elongate control rod which is longitudinally displaceable between end points along a path of movement by said motor for providing operating functions of said apparatus, and a catch rod coupled to said control rod and said loading mechanism for displacing the loading mechanism during a part of the movement of the control rod, said catch rod including a recess;
  a logic circuit connected to said motor for controlling the operation of said motor and the displacement of said control rod;

a control switch connected to said logic circuit for providing actuation signals thereto, said control switch including a moveable switch element moveable at least between first and second switch positions; and a pair of fixed guides, said control rod further including a two-armed detent rocker, said detent rocker being spring loaded whereby one arm of said two-armed detent rocker resides in the recess of said catch rod, said second arm of said two-armed detent rocker cooperating with said fixed guides to cause said first arm of said two-armed detent rocker to be swiveled out of said recess whereby said catch rod and said control rod are decoupled, and actuation means for moving said switch element of said control switch from one switch position to the other switch position, at different positions of said control rod along said path of movement of said control rod, to cause said control switch to provide control signals to said logic circuit for operating said drive mechanism.

2. A magnetic tape apparatus, comprising:

a loading mechanism for loading and ejecting a cassette from said apparatus, said loading mechanism including a coupling member;

a drive mechanism including a motor, an elongate control rod which is longitudinally displaceable between end points along a path of movement by said motor for providing operating functions of said apparatus, said control rod including a catch pocket engageable by said coupling member of said loading mechanism, and a catch rod coupled to said control rod and said loading mechanism for displacing said loading mechanism during a part of the movement of the control rod, a logic circuit connected to said motor for controlling the operation of said motor and the displacement of said control rod;

a control switch connected to said logic circuit for providing actuation signals thereto, said control switch including a moveable switch element moveable at least between first and second switch positions;

interacting guides for cooperation with said catch rod for swiveling the catch rod into engagement with said coupling member and for swiveling said catch rod out of engagement with said coupling member;

said control rod further including actuation means for moving said switch element of said control switch from one switch position to the other switch position, at different positions of said control rod along said path of movement of said control rod, to cause said control switch to provide control signals to said logic circuit for operating said drive mechanism.

3. Magnetic tape cassette apparatus according to claim 2, wherein said catch rod is uncoupled from said control rod at a position of said control rod between said end points during the movement of said control rod.

4. Magnetic tape cassette apparatus according to claim 2, wherein said catch rod is uncoupled from said loading mechanism at an intermediate position of said control rod between said end points during the movement of said control rod along its path of movement.

5. Magnetic tape cassette apparatus according to claim 2, wherein said moveable switch element of said control switch is a switching projection which when operated upon by said actuation means causes said control switch to produce switching pulses.

6. Magnetic tape cassette apparatus according to claim 2, including a servo gear unit having a gear and wherein said control rod includes rack toothing for interacting with said gear.

7. Magnetic tape cassette apparatus according to claim 6, including a head plate which can be swiveled between a non-playing position and a playing position and wherein said servo gear unit drives said control rod to one end of its path of movement in order to swivel said head plate into its playing position, said moveable switch element of said control switch being operated simultaneously by said an actuator from one switch position to the other switch position to cause said servo gear unit to move said control rod away from said one end of its path of movement.

8. Magnetic tape cassette apparatus according to claim 7, wherein said servo gear unit includes an actuation means for cooperation with said moveable switch element to cause said control switch to produce a signal indicating that said head plate has been swiveled into its playing position upon said head plate being so swiveled.

9. Magnetic tape cassette apparatus according to claim 8, wherein said servo gear unit actuation means is located on a switching member which includes a stop pin which cooperates with said head plate to hold the servo gear unit in engagement with said control rod.

10. Magnetic tape cassette apparatus according to claim 9, including a transmission gear driven by said motor and a winding disc and a rewinding disc, each cooperable with said transmission gear to cause winding or rewinding operation of the cassette apparatus, respectively, and wherein said switching member moves said transmission gear into engagement with either the winding disc or the rewinding disc as said head plate is brought into the playing position.

11. Magnetic tape cassette apparatus according to claim 2, wherein said catch rod is resiliently flexible in the longitudinal direction.

12. A magnetic tape apparatus according to claim 2, wherein each of said catch rod and said control rod includes a switch actuator for actuating said control switch, and, at least at respective end points of their path of movement, the control rod and the catch rod are uncoupled from one another so that their switch actuator can act on the control switch independently of the position of the other rod.

13. A magnetic tape apparatus according to claim 2, characterized in that the control switch has a switching projection moveable between a neutral central position and two opposing directions corresponding to the displacement of the control rod and which, when not mechanically loaded, is situated in the neutral central position and which when actuated by a switch actuator in either displacement direction of the rods emits switching pulses.

14. A magnetic tape apparatus according to claim 2, wherein said catch rod is swivelably mounted on the control rod and said catch pocket, into which said coupling member of the loading mechanism is engageable, is formed to the side of an end face of said control rod.

15. A magnetic tape apparatus according to claim 14, wherein, for the formation of said catch pocket, said catch rod has a coupling projection which, in the coupling position, is situated at a distance from an end face of the control rod, the catch pocket being formed between the coupling projection, the end face and the control rod.

16. A magnetic tape apparatus according to claim 14, wherein the catch rod extends beyond the catch pocket and the extension interacts with said guides arranged on the drive mechanism in such a way that these guides swivel the catch rod for the purpose of catching said coupling member in said catch pocket or releasing it from said catch pocket.

* * * * *